(12) United States Patent
Mizutani et al.

(10) Patent No.: US 7,752,051 B2
(45) Date of Patent: Jul. 6, 2010

(54) DIALOG SUPPORTING APPARATUS THAT SELECTS SIMILAR DIALOG HISTORIES FOR UTTERANCE PREDICTION

(75) Inventors: Kenji Mizutani, Nara (JP); Yoshiyuki Okimoto, Soraku-gun (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 11/349,976

(22) Filed: Feb. 9, 2006

(65) Prior Publication Data

US 2006/0129409 A1 Jun. 15, 2006

Related U.S. Application Data

(63) Continuation of application No. PCT/JP2005/018429, filed on Oct. 5, 2005.

(30) Foreign Application Priority Data

Oct. 8, 2004 (JP) ............................. 2004-296775

(51) Int. Cl.
- G06F 17/28 (2006.01)
- G06F 17/20 (2006.01)
- G06F 17/27 (2006.01)
- G10L 15/26 (2006.01)
- G10L 21/00 (2006.01)

(52) U.S. Cl. ............................. 704/275; 704/2; 704/8; 704/9; 704/235; 704/270; 704/277

(58) Field of Classification Search .......... 704/275.277, 704/9, 8, 270, 275, 277, 231–257, 2–7; 434/156; 707/3

See application file for complete search history.

(56) References Cited

U.S. PATENT DOCUMENTS 5,854,997 A * 12/1998 Sukeda et al. ................. 704/3

(Continued)

FOREIGN PATENT DOCUMENTS

JP 07105220 A * 4/1995

(Continued)

OTHER PUBLICATIONS

Reithinger, N.; Engel, R.; Kipp, M.; Klesen, M., "Predicting dialogue acts for a speech-to-speech translation system ," Spoken Language, 1996. ICSLP 96. Proceedings., Fourth International Conference on , vol. 2, no., pp. 654-657 vol. 2, Oct. 3-6, 1996.*

(Continued)

*Primary Examiner*—David R Hudspeth
*Assistant Examiner*—Paras Shah
(74) *Attorney, Agent, or Firm*—Wenderoth, Lind & Ponack, L.L.P.

(57) ABSTRACT

A dialog supporting apparatus is provided which can support an on-going dialog so that the dialog is smoothly completed irrespective of the other party in the dialog. The dialog supporting apparatus includes utterance receiving units which receive the utterances of the dialog participants and output utterance information for identifying an utterance. Moreover, the dialog supporting apparatus includes utterance outputting units which output the utterance information from the other participant in the dialog as an utterance, and an utterance processing unit which transforms the utterance identified by the utterance information into an other utterance form. Furthermore, the dialog supporting apparatus includes a dialog history selection unit which selects an optimum dialog history in a dialog history database and an utterance prediction unit which predicts utterances in the dialog based on the selected dialog history.

14 Claims, 43 Drawing Sheets

U.S. PATENT DOCUMENTS

| | | | |
|---|---|---|---|
| 5,918,222 A * | 6/1999 | Fukui et al. | 707/1 |
| 6,154,720 A * | 11/2000 | Onishi et al. | 704/2 |
| 6,321,188 B1 * | 11/2001 | Hayashi et al. | 704/4 |
| 6,622,119 B1 * | 9/2003 | Ramaswamy et al. | 704/9 |
| 6,792,406 B1 * | 9/2004 | Fujimura et al. | 704/257 |
| 6,917,920 B1 * | 7/2005 | Koizumi et al. | 704/277 |
| 7,103,553 B2 * | 9/2006 | Applebaum et al. | 704/275 |
| 7,197,460 B1 * | 3/2007 | Gupta et al. | 704/270.1 |
| 2002/0022954 A1 * | 2/2002 | Shimohata et al. | 704/3 |
| 2002/0038207 A1 * | 3/2002 | Mori et al. | 704/9 |
| 2002/0120436 A1 | 8/2002 | Mizutani et al. | 704/2 |
| 2002/0138588 A1 * | 9/2002 | Leeds | 709/217 |
| 2003/0009448 A1 * | 1/2003 | Covington et al. | 707/3 |
| 2003/0091163 A1 * | 5/2003 | Attwater et al. | 379/88.01 |
| 2004/0186721 A1 * | 9/2004 | Beynon et al. | 704/270 |
| 2005/0144013 A1 * | 6/2005 | Fujimoto et al. | 704/277 |
| 2006/0025091 A1 * | 2/2006 | Buford | 455/154.2 |
| 2006/0069546 A1 * | 3/2006 | Rosser et al. | 704/9 |

FOREIGN PATENT DOCUMENTS

| | | | |
|---|---|---|---|
| JP | 09319750 A | * | 12/1997 |
| JP | 2000090087 A | * | 3/2000 |
| JP | 2003-030187 | | 1/2003 |
| JP | 2003-288339 | | 10/2003 |

OTHER PUBLICATIONS

Partial English translation of Japanese Unexamined Patent Application Publication No. 2003-30187 (paragraph Nos. [0019], [0029], [0032], [0035]-[0040], [0042]-[0049], [0058], [0102], [0120] and [0124], and Figs. 11-13), Jan. 31, 2003.

* cited by examiner

FIG. 2

| Utterance No. | Dialog participant 1 | Dialog participant 2 |
|---|---|---|
| 1 | いらっしゃいませ。 | May I help you? |
| 2 | チェックインをお願いします。 | Check-in, please. |
| 3 | 予約はされていますか。 | Have you made reservation? |
| 4 | はい。 | Yes. |
| 5 | 喫煙の部屋でよろしいでしょうか。 | Do you prefer smoking room? |
| 6 | 禁煙でお願いします。 | Non-smoking room, please. |
| 7 | かしこまりました。 | Certainly. |
| 8 | このカードに記入してください。 | Please fill in the form. |
| 9 | いいえ。 | No. |
| 10 | ありがとうございます。 | Thank you. |
| 11 | パスポートを見せてください。 | Please show me your passport. |
| 12 | クレジットカードを確認させてください。 | Please let me confirm your credit card. |
| 13 | クレジットカードで支払えますか? | May I pay by credit card? |
| 14 | タクシーを呼んでください。 | Please call me taxi. |
| 15 | ホテルの電話番号を教えて下さい。 | Please tell me telephone number of this hotel. |
| 16 | 部屋でインターネットは使えますか? | Can I use internet in my room? |
| 17 | 朝食は何時からですか? | What time can I have breakfast? |
| 18 | 8時です。 | Eight o'clock. |
| 19 | 電話番号は222-2222です。 | The telephone number is 222-2222. |
| 20 | いってらっしゃいませ。 | Have a nice day. |
| ... | ... | ... |

FIG. 3A  Dialog history d1  (J,E)=(太郎、Tom)@ホテル

| | |
|---|---|
| E1: | May I help you? |
| J2: | チェックインをお願いします。 |
| E3: | Have you made reservation? |
| J4: | はい。 |
| E5: | Do you prefer smoking room? |
| J6: | 禁煙でお願いします。 |
| E7: | Certainly. |
| E8: | Please fill in the form. |

FIG. 3B  Dialog history d2  (J,E)=(次郎、Ken)@ホテル

| | |
|---|---|
| E1: | May I help you? |
| E8: | Please fill in this form. |
| J2: | チェックインをお願いします。 |
| E3: | Have you made reservation? |
| J4: | はい。 |
| E5: | Do you prefer smoking room? |
| J6: | 禁煙でお願いします。 |
| E7: | Certainly. |

FIG. 3C  Dialog history d3  (J,E)=(三郎、Hanako)@ホテル

| | |
|---|---|
| E1: | May I help you? |
| E3: | Have you made reservation? |
| J4: | はい。 |
| J2: | チェックインをお願いします。 |
| E8: | Please fill in this form. |
| E5: | Do you prefer smoking room? |
| J6: | 禁煙でお願いします。 |
| E7: | Certainly. |

FIG. 3D  Dialog history d4  (J,E)=(四郎、Mary)@ホテル

| | |
|---|---|
| E1: | May I help you? |
| E8: | Please fill in this form. |
| E3: | Have you made reservation? |
| J4: | はい。 |
| E5: | Do you prefer smoking room? |
| J6: | 禁煙でお願いします。 |

FIG. 3E  Dialog history d5  (J,E)=(太郎、John)@レンタカー

| | |
|---|---|
| E1: | May I help you? |
| E3: | Have you made reservation? |
| J4: | はい。 |
| E11: | Show me your passport |
| J13: | クレジットカードで支払えますか？ |
| E4: | Yes |

FIG. 9A

Similarity degree of dialog history da to dialog history db $$r(d_a \, d_b) = \frac{1}{size(d_a)^2} \sqrt{\sum_{b \in d_a} size(b)^2}$$

FIG. 9B

Example of calculation for similarity degree

Dialog history da:
- b1: Utterance u1, Utterance u2, Utterance u3, Utterance u4, Utterance u5
- b2: Utterance u6, Utterance u7
- b3: Utterance u8, Utterance u9, Utterance u10, Utterance u11
- b4: Utterance u12

Dialog history db:
- Utterance u6, Utterance u7
- Utterance u1, Utterance u2, Utterance u3, Utterance u4, Utterance u5
- Utterance u8, Utterance u9, Utterance u10, Utterance u11
- Utterance u13

$$r(d_a \mid d_b) = \frac{1}{4^2} \sqrt{5^2 + 2^2 + 4^2 + 1^2} \approx 0.424$$

FIG. 10

1 Initialization step

The number of utterances m included in dialog 1
The number of utterances n included in dialog 2
Generate array of a[0~m][0~n] and set initial value
a[i][0]=i (i=0~m)
a[0][j]=j (i=0~n)

2 Calculation step for i=1 to m
for j=1 to n
Calculate a[i][j] using following three expressions, and select and record resulting smallest value 1 a[i-1][j-1]+(ith utterance of dialog 1 and jth utterance of dialog 2 are Same→0  Different→1)
2 a[i-1][j]+1
3 a[i][j-1]+1 next j
nexti

3 Result obtainment step

Output selection of a[0][0] to a[m][n], and assign φ to nonmatching utterance

Dialog history d4

```
E1: May I help you?
E8: Please fill in this form.
E3: Have you made reservation?
J4: はい。
E5: Do you prefer smoking room?
J6: 禁煙でお願いします。
```

Dialog history d4'

```
E1: May I help you?
E8: Please fill in this form.
E3: Have you made reservation?
J4: はい。
E5: Do you prefer smoking room?
J6: 禁煙でお願いします。
φ:
φ:
```

FIG. 25

| Utterance No. | Dialog participant 1 | Dialog participant 2 |
|---|---|---|
| 1 | 欢迎光临。 | May I help you? |
| 2 | 可以办理入住吗？ | Check-in, please. |
| 3 | 您预订过了吗？ | Have you made reservation? |
| 4 | 是。 | Yes. |
| 5 | 您吸烟吗？ | Do you prefer smoking room? |
| 6 | 我想要禁烟的房间。 | Non-smoking room, please. |
| 7 | 知道了。 | Certainly. |
| 8 | 请写在这张单子上。 | Please fill in the form. |
| 9 | 不。 | No. |
| 10 | 多谢。 | Thank you. |
| 11 | 请出示护照。 | Please show me your passport. |
| 12 | 我来确认一下信用卡。 | Please let me confirm your credit card. |
| 13 | 可以有信用卡支付吗？ | May I pay by credit card? |
| 14 | 能给叫辆出租车吗？ | Please call me taxi. |
| 15 | 请问饭店的电话号码是多少？ | Please tell me telephone number of this hotel. |
| 16 | 房间内能上网吗？ | Can I use internet in my room? |
| 17 | 什么时候早餐？ | What time can I have breakfast? |
| 18 | 8点。 | Eight o'clock. |
| 19 | 电话号码是222-2222。 | The telephone number is 222-2222. |
| 20 | 祝你一天过得愉快。 | Have a nice day. |
| ... | ... | ... |

FIG. 26A Dialog history d6  (C,E)=(太郎、Tom)@饭店

E1: May I help you?
C2: 可以办理入住吗？
E3: Have you made reservation?
C4: 是。
E5: Do you prefer smoking room?
C6: 我想要禁烟的房间。
E7: Certainly.
E8: Please fill in the form.

FIG. 26B Dialog history d7  (C,E)=(次郎、Ken)@饭店

E1: May I help you?
E8: Please fill in this form.
C2: 可以办理入住吗？
E3: Have you made reservation?
C4: 是。
E5: Do you prefer smoking room?
C6: 我想要禁烟的房间。
E7: Certainly.

FIG. 26C Dialog history d8  (C,E)=(三郎、Hanako)@饭店

E1: May I help you?
E3: Have you made reservation?
C4: 是。
C2: 可以办理入住吗？
E8: Please fill in this form.
E5: Do you prefer smoking room?
C6: 我想要禁烟的房间。
E7: Certainly.

FIG. 26D Dialog history d9  (C,E)=(四郎、Mary)@饭店

E1: May I help you?
E8: Please fill in this form.
E3: Have you made reservation?
C4: 是。
E5: Do you prefer smoking room?
C6: 我想要禁烟的房间。

FIG. 26E Dialog history d10  (C,E)=(太郎、John)@出货车

E1: May I help you?
E3: Have you made reservation?
C4: 是。
E11: Show me your passport
C13: 可以有信用卡支付吗？
E4: Yes ＃ DIALOG SUPPORTING APPARATUS THAT SELECTS SIMILAR DIALOG HISTORIES FOR UTTERANCE PREDICTION

CROSS REFERENCE TO RELATED APPLICATION

This is a continuation application of PCT application No. PCT/JP2005/018429, filed Oct. 5, 2005, designating the United States of America.

BACKGROUND OF THE INVENTION (1) Field of the Invention

The present invention relates to a dialog supporting apparatus which supports an on-going dialog made between people.

(2) Description of the Related Art

Conventionally, a translation device has been developed with a purpose of supporting an on-going dialog in different languages respectively spoken by travelers and local people at travel destinations abroad or the like. A representative example is a translation apparatus which is obtained by providing a translation scheme based on text and translation of example sentences and example usages, on a small information processing apparatus such as a PDA (Personal Digital Assistance). Such an apparatus is provided with thousands of example usages in order to cover general travel conversation, and requires a user to select a desired example usage by viewing the list of example usages. Hence, the apparatus has a usability problem when it comes to actual use. Especially in the case where the apparatus has a small display for displaying a list of example usages and thus the number of example usages which can be viewed at one time is small, this problem is more noticeable. In addition, assuming a general use status of a translation apparatus, example usages corresponding to several sentences must be used in the dialog with the other party in great many cases. Thus, it takes more time than expected to complete an on-going dialog by means of a translation apparatus. Therefore, in order to achieve a final purpose of supporting an on-going dialog made between people, there is a need to add a supplementary function for enabling a user to immediately select a desired example usage from among the list of large number of example usages.

As a method for solving this problem, there has been provided an approach for narrowing down candidate next utterances of a user using example dialog models or a corpus of conversation training histories (for example, refer to Japanese Laid-open Patent Application No. 2003-30187).

SUMMARY OF THE INVENTION

Narrowing down candidate next utterances based on past dialog history of a user of the translation device is effective in the case where the utterances of the other party are included in the utterances. In addition, the narrowing down of candidate next utterances based on a virtual dialog which has been previously uttered in training or typical dialog patterns is effective in the case where the other party utters in compliance with the dialog pattern as expected by the user. However, it is common that dialog patterns vary among people. Here is an example case where a traveler starts a dialog with a train station attendant in order to reserve a train ticket. In response to the traveler's utterance of "I'd like to reserve a train ticket", a train station attendant may start the dialog with an utterance relating to the date and time of a train ride saying "What day would you like to take train?" and another train station attendant may start the dialog with an utterance relating to the destination of a train saying "Where would you like to go?". Such being the case, there is a problem that the narrowing-down of the candidates utterances fails depending on the other party in an on-going dialog. An additional problem is that inappropriate narrowing-down confuses dialog participants, resulting in increasing the time to complete the dialog, contrary to the purpose.

The present invention has been conceived in view of these circumstances. An object of the present invention is to provide a dialog supporting apparatus which can support a dialog so that the dialog is smoothly completed irrespective of who the other party is.

In order to achieve the above-described object, the dialog supporting apparatus of the present invention supports an on-going dialog made by dialog participants. The dialog supporting apparatus includes: a dialog history selection unit which selects a dialog history from a dialog history database, based on the information identifying the dialog participants and the situation of the dialog; and an utterance prediction unit which predicts a next utterance of one of the dialog participants in the dialog, based on the dialog history selected by the dialog history selection unit. Here, the dialog history database stores dialog histories of the dialog participants and people other than the dialog participants.

The dialog supporting apparatus of the present invention enables a user to easily select example usages from among the candidate next utterances of the user. Thus, it eliminates the necessity for the other party to wait, and therefore the dialog supported by the dialog supporting apparatus can be smoothly advanced.

The disclosure of Japanese Patent Application No. 2004-296775 filed on Oct. 8, 2004 including specification, drawings and claims is incorporated herein by reference in its entirety.

The disclosure of PCT application No. PCT/JP2005/018429, filed on Oct. 5, 2005, designating the United States of America, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing an example of interrelationships among the respective utterance numbers, the utterances of a dialog participant, and the utterances of another dialog participant;

FIGS. 3A to 3E each is a diagram showing an example of a dialog history stored in a dialog history database;

FIG. 9A is a diagram showing an equation which defines a degree of similarity between dialog histories;

FIG. 9B is an example of calculating the degree of similarity;

FIG. 10 is a diagram showing an algorithm of a dynamic programming which adjusts the number of utterances of dialog histories;

FIG. 25 is a dialog showing an example of interrelationships among the respective utterance numbers, the utterances of a dialog participant, and the utterances of another dialog participant;

FIGS. 26A to 26E each is a diagram showing an example dialog history stored in the dialog history database;

DETAILED DESCRIPTION OF THE INVENTION

The dialog supporting apparatus, of a first embodiment of the present invention, supports an on-going dialog made by dialog participants. The dialog supporting apparatus includes: a dialog history selection unit which selects a dialog history from a dialog history database, based on the information identifying the dialog participants and the situation of the dialog; and an utterance prediction unit which predicts a next utterance of one of the dialog participants in the dialog, based on the dialog history selected by the dialog history selection unit. Here, the dialog history database stores dialog histories of the dialog participants and people other than the dialog participants.

This makes it possible to search the histories, which include his or her own dialog histories, the dialog histories of the other party and dialog histories of people other than the dialog participants, for the history which is most similar to the dialog which is likely to be made next, and to predict the next dialog based on the history. Therefore, it becomes possible to support the dialog so that the dialog can be smoothly completed regardless of who the other party is.

Here, in a first aspect of the present invention, it is preferable that the dialog history selection unit of the dialog supporting apparatus extracts, as a standard dialog history, a dialog history which is most similar in the situation of the dialog from among dialog histories of each dialog participant, and that it selects a dialog history having a high degree of similarity with respect to each standard dialog history.

This makes it possible to predict the next utterance of a dialog participant based on the dialog history which has a high degree of similarity to the standard dialog history.

In addition, in a first aspect of the present invention, the dialog supporting apparatus may further include: an utterance receiving unit which receives an utterance of one of the dialog participants; an utterance processing unit which transforms the utterance received by the utterance receiving unit into the other utterance form; and an utterance outputting unit which outputs the utterance of the other utterance form transformed by the utterance processing unit.

This makes it possible to support an on-going dialog where different languages such as Japanese and English are used.

Note that the present invention can be realized not only as a dialog supporting apparatus like this, but also as a dialog supporting method having steps corresponding to the unique units which are provided to the dialog supporting apparatus like this, and as a program causing a computer to execute these steps. Of course, the program can be distributed through a recording medium such as a CD-ROM and a communication medium such as the Internet.

The embodiments of the present invention will be described with reference to the figures.

Figure 1:
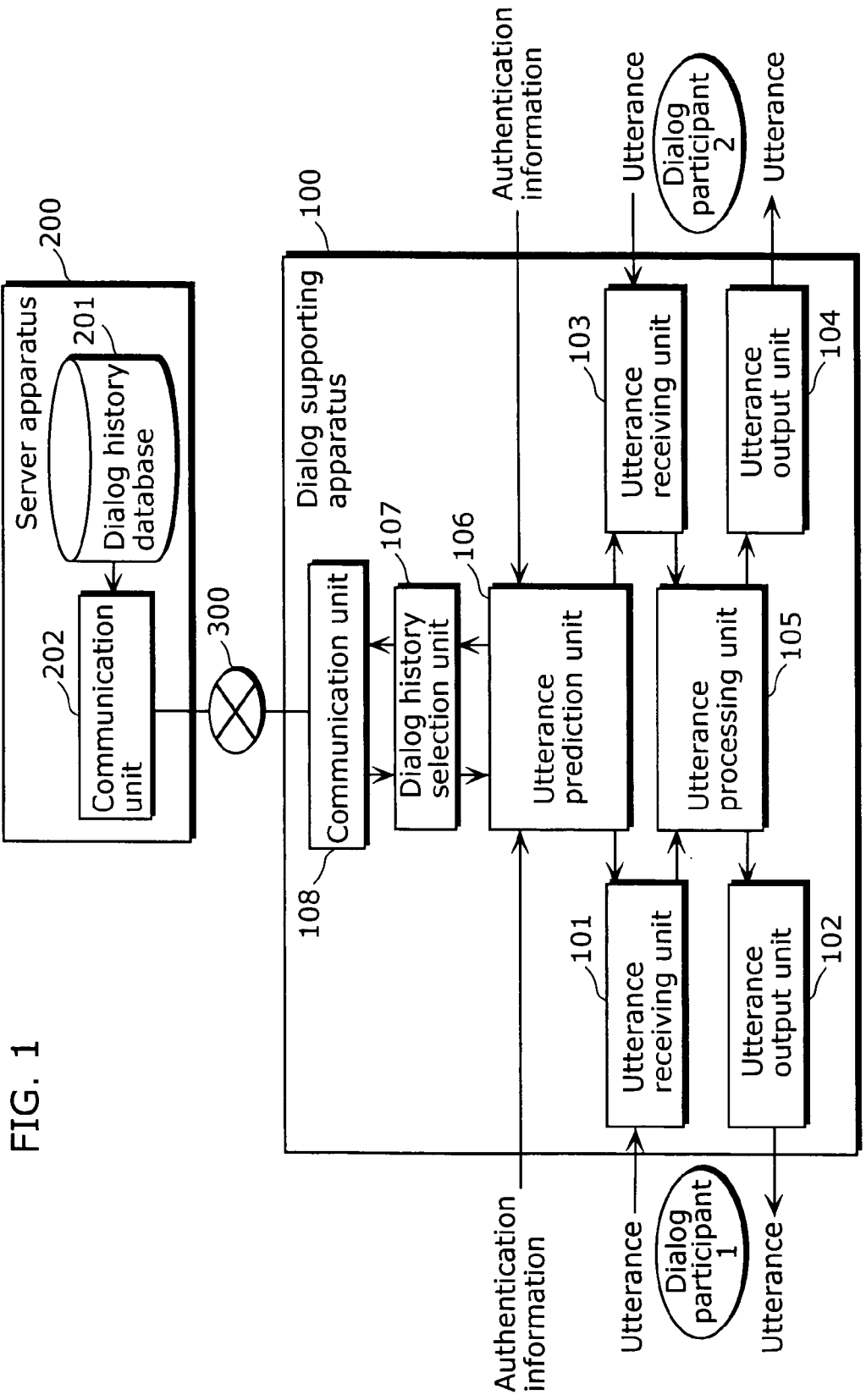
FIG. 1 is a block diagram showing the configuration of a first embodiment of the dialog supporting system of the present invention.

FIG. 1 is a block diagram showing the configuration of a first embodiment of the dialog supporting system of the present invention.

The dialog supporting system is intended for supporting dialog between people. As shown in FIG. 1, the dialog supporting system includes a dialog supporting apparatus 100, and a server apparatus 200 which is connected to the dialog supporting apparatus 100 through a network 300.

The server apparatus 200 includes a dialog history database 201 and a communication unit 202. The dialog history database 201 stores various types of dialog histories. The communication unit 202 communicates with the dialog supporting apparatus 100 through the network 300.

On the other hand, as shown in FIG. 1, the dialog supporting apparatus 100 includes: an utterance receiving unit 101; an utterance outputting unit 102; an utterance receiving unit 103; an utterance outputting unit 104; an utterance processing unit 105; an utterance prediction unit 106; a dialog history selection unit 107; and a communication unit 108.

The utterance receiving unit 101 receives an utterance of a dialog participant 1 and outputs utterance information for identifying the utterance. The utterance outputting unit 102 outputs the utterance information from another dialog participant, who is the dialog participant 2, to the dialog participant 1 as an utterance. Likewise, the utterance receiving unit 103 receives an utterance of the dialog participant 2 and outputs the utterance information. The utterance outputting unit 104 outputs the utterance information from the dialog participant 1 to the dialog participant 2 as an utterance. The utterance processing unit 105 transforms the utterances, which are identified by the utterance information outputted from the utterance receiving unit 101 and the utterance information outputted from the utterance receiving unit 103, into the other party's utterance form.

Before a dialog is started, the utterance prediction unit 106 obtains the authentication information of the dialog participant 1 and the dialog participant 2 and the situation of the dialog from the dialog participants. In addition, after the dialog is started, the utterance prediction unit 106 predicts an utterance in the dialog and displays it on a display panel of the dialog supporting apparatus before the utterance receiving unit 101 receives an utterance from the dialog participant 1 or before the utterance receiving unit 103 receives an utterance from the dialog participant 2.

The dialog history selection unit 107 searches the dialog history database 201 of the server apparatus 200 for the authentication information obtained by the utterance prediction unit 106, and selects the optimum dialog history from among the dialog history database 201. The communication unit 108 communicates with the server 200 through a network 300.

Next, here will be described how the dialog supporting system configured in the manner described above, operates in the case of supporting dialog in different languages. Here, it is assumed that the dialog participant 1 speaks Japanese, and the dialog participant 2 speaks English. FIG. 2 is a diagram showing an example of the interrelationship among the utterance numbers, the utterances of the dialog participant 1 and the utterances of the dialog participant 2.

The utterance receiving unit 101 transforms the received utterance of the dialog participant 1 into corresponding utterance information. The corresponding utterance information is, for example, an utterance number in FIG. 2. The utterance processing unit 105 translates an utterance (Japanese) of the dialog participant 1 into the corresponding utterance (English) of the dialog participant 2, and outputs the corresponding character string. For example, in the case where an utterance number 1 is inputted, the utterance processing unit 105 outputs the character string of "May I help you?" to the utterance outputting unit 104 as utterance information.

In contrast, the utterance receiving unit 103 transforms the received utterance of the dialog participant 2 into the corresponding utterance information. The utterance information is, for example, an utterance number in FIG. 2. The utterance processing unit 105 translates an utterance (English) of the dialog participant 2 into the corresponding utterance (Japanese) of the dialog participant 1, and outputs the corresponding character string. For example, in the case where the utterance number 1 is inputted, the utterance processing unit 105 outputs the character string of

「いらっしゃいませ。」 to the utterance outputting unit 102 as the utterance information. After that, in order to simplify the following description considering the language directions, the utterance number 1 inputted by the dialog participant 1 is abbreviated as J1 and an utterance number 2 inputted by the dialog participant 2 is abbreviated as E1.

The utterance receiving unit 101 allows the dialog participant 1 to directly select an utterance from the list of Japanese utterances, and outputs the utterance number as the utterance information. In addition, the utterance receiving unit 103 allows the dialog participant 2 to directly select an utterance from the list of English utterances, and outputs the utterance number as the utterance information. As for the configuration of the utterance receiving unit 101 or the utterance receiving unit 103, it may be realized by the processing of projecting the speech of each dialog participant to one of the utterance numbers using a speech recognition processing. In addition, it is realized by the processing of allowing a dialog participant to input a transcription or a character string corresponding to the pronunciation of the utterance through a keyboard and projecting the speech to one of the utterance numbers.

FIGS. 3A to 3E each is a diagram showing an example dialog history stored in the dialog history database 201. Dialog histories are histories of utterances made in the past by dialog participants, and in each dialog history the utterances of the dialog participants are placed in time sequence. Each utterance corresponds to one of the utterances defined in FIG. 2. There is a need to distinguish even the same utterance number depending on a dialog participant. Thus, J is assigned to the utterances made in Japanese and E is assigned to the utterances made in English, and the J and E each is defined as a label of each utterance in the dialog history. After that, in order to simplify the following description, a dialog history is described using column labels. For example, the dialog history d1 is described as d1: E1, J2, E3, J4, E5, J6, E7 and E8. The authentication information of the dialog participants who made the dialog and the topic of the dialog (the situation of the dialog) are recorded in the dialog history. For example, information indicating that the utterances assigned with J are Taro's, the utterances assigned with E are Tom's, and the topic relates to a hotel.

Figure 4:
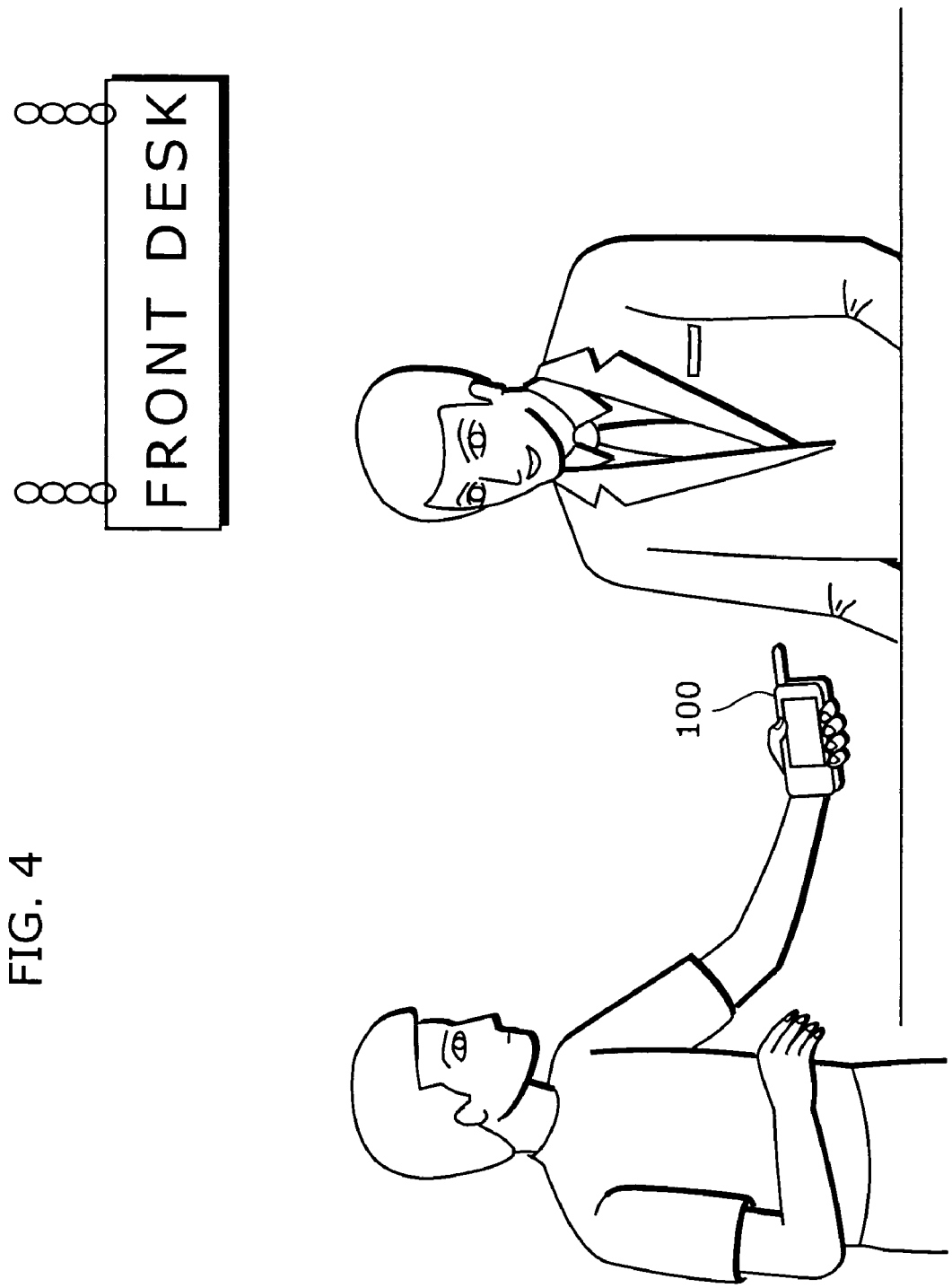
FIG. 4 is a diagram showing an example scene where the dialog supporting apparatus of the present invention is used.

As shown in FIG. 4, here will be described an example case where the dialog participant 1 is a Japanese traveler, the dialog participant 2 is a clerk of a hotel who speaks English, and the topic for the dialog is to check in the hotel.

Figure 5:
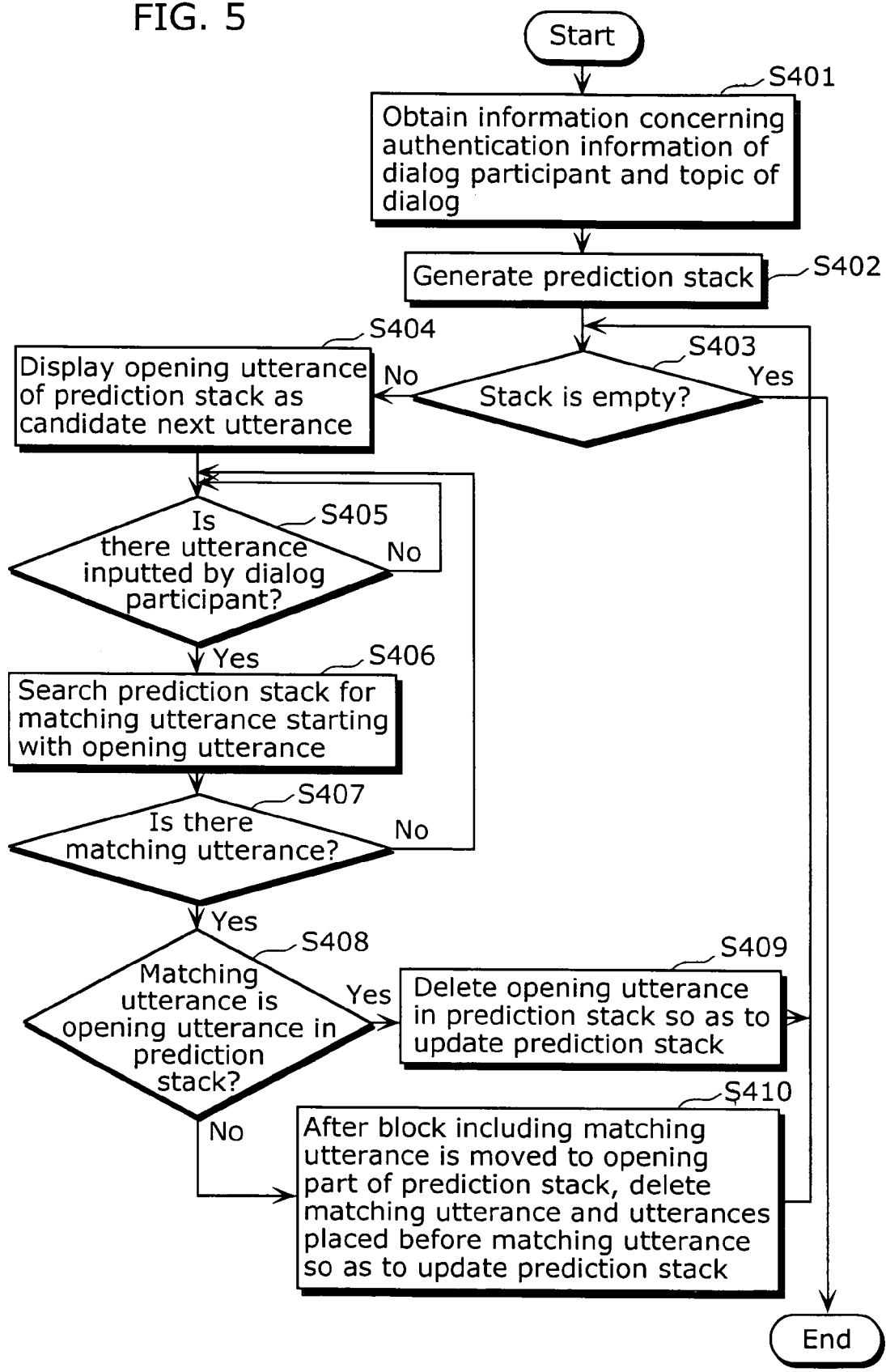
FIG. 5 is a flow chart showing the operation flow of an utterance prediction unit.
Figure 6:
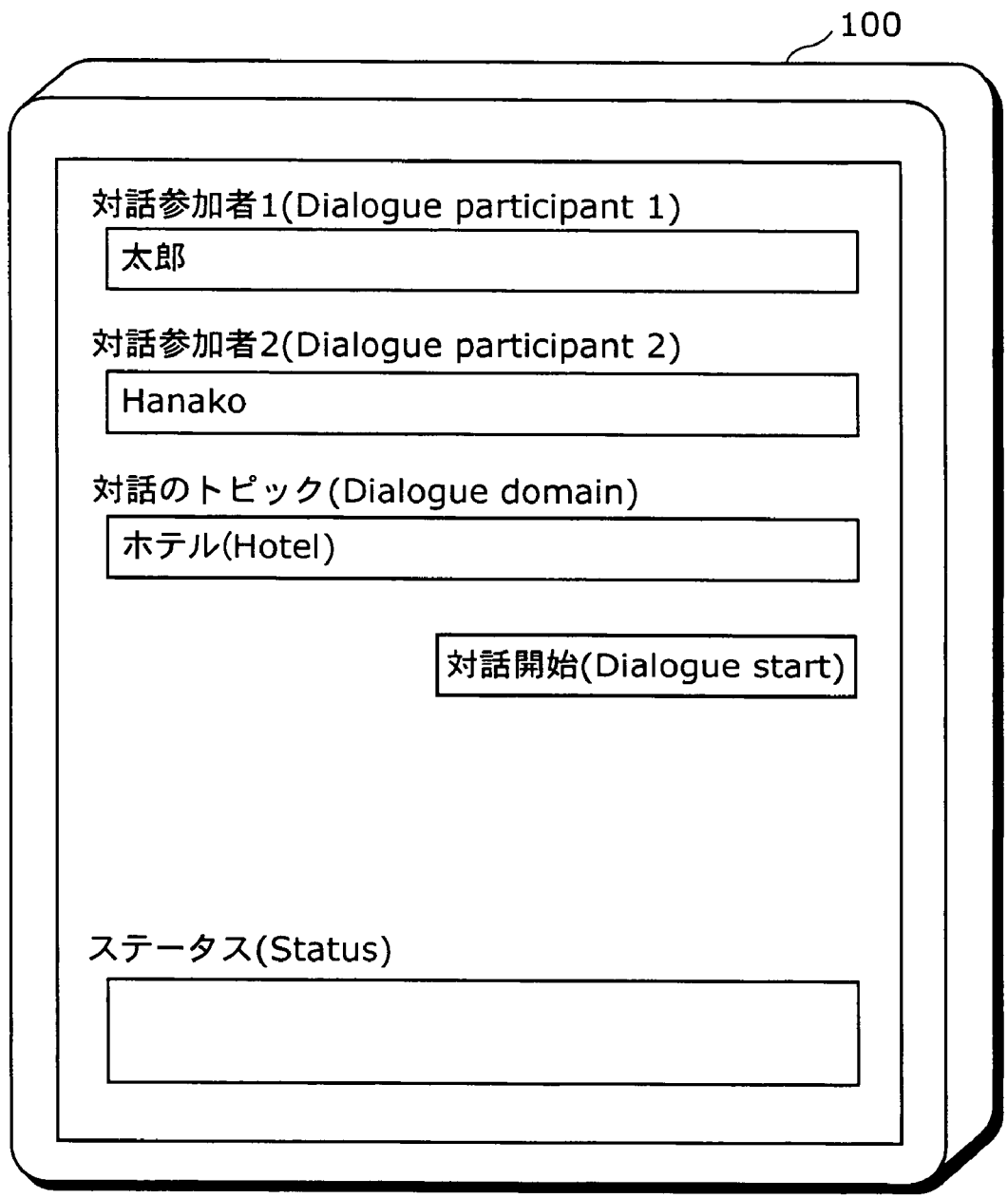
FIG. 6 is a diagram showing a display example of the dialog supporting apparatus of the present invention.

FIG. 5 is a flow chart showing the operation flow of the utterance prediction unit 106. The utterance prediction unit 106 identifies the dialog participants and the topic of the dialog which are needed for predicting utterances first (Step S401). For example, in the dialog supporting apparatus 100 which is realized as a PDA as shown in FIG. 6, the information concerning the dialog participants is obtained by allowing the participants to input directly through a touch panel the names of the dialog participant 1 and the dialog participant 2, and the topic of the dialog. The authentication information of the dialog participants may be obtained by a method for automatically obtaining it using fingerprint authentication and individual information provided in obtaining a credit card, other than the method for manual inputs. In addition, as for obtaining the topic of the dialog, the topic of the dialog may be obtained by a method for automatically associating with the automatically-obtainable information relating to the position where a PDA is placed (the information includes the information relating to the location such as a restaurant, hospital and hotel).

Figure 7:
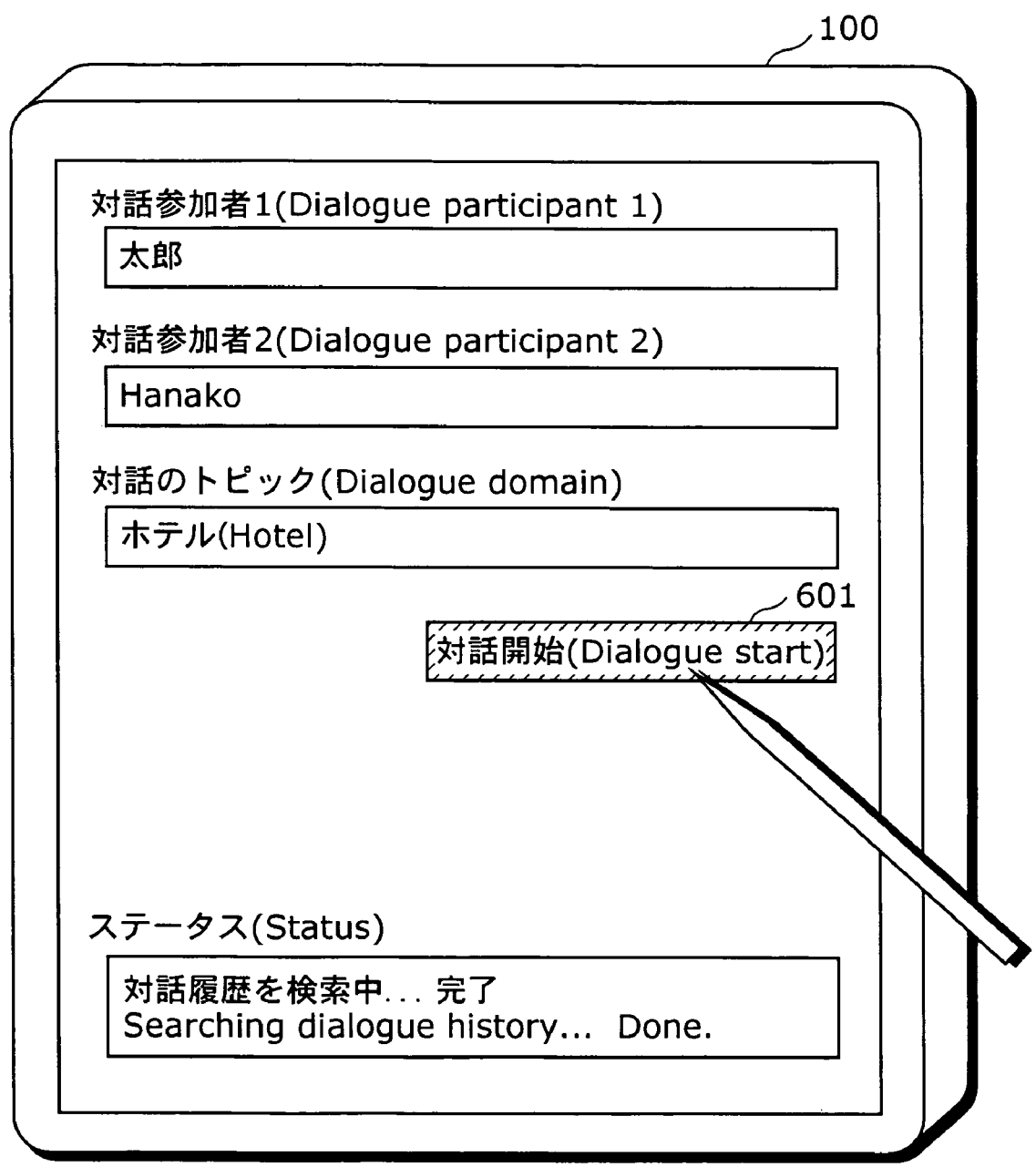
FIG. 7 is a diagram showing a display example of the dialog supporting apparatus of the present invention.

The utterance prediction unit 106 requests the dialog history selection unit 107 to generate a prediction stack, when the dialog start button 601 is pressed as shown in FIG. 7 (Step S402).

Figure 8:
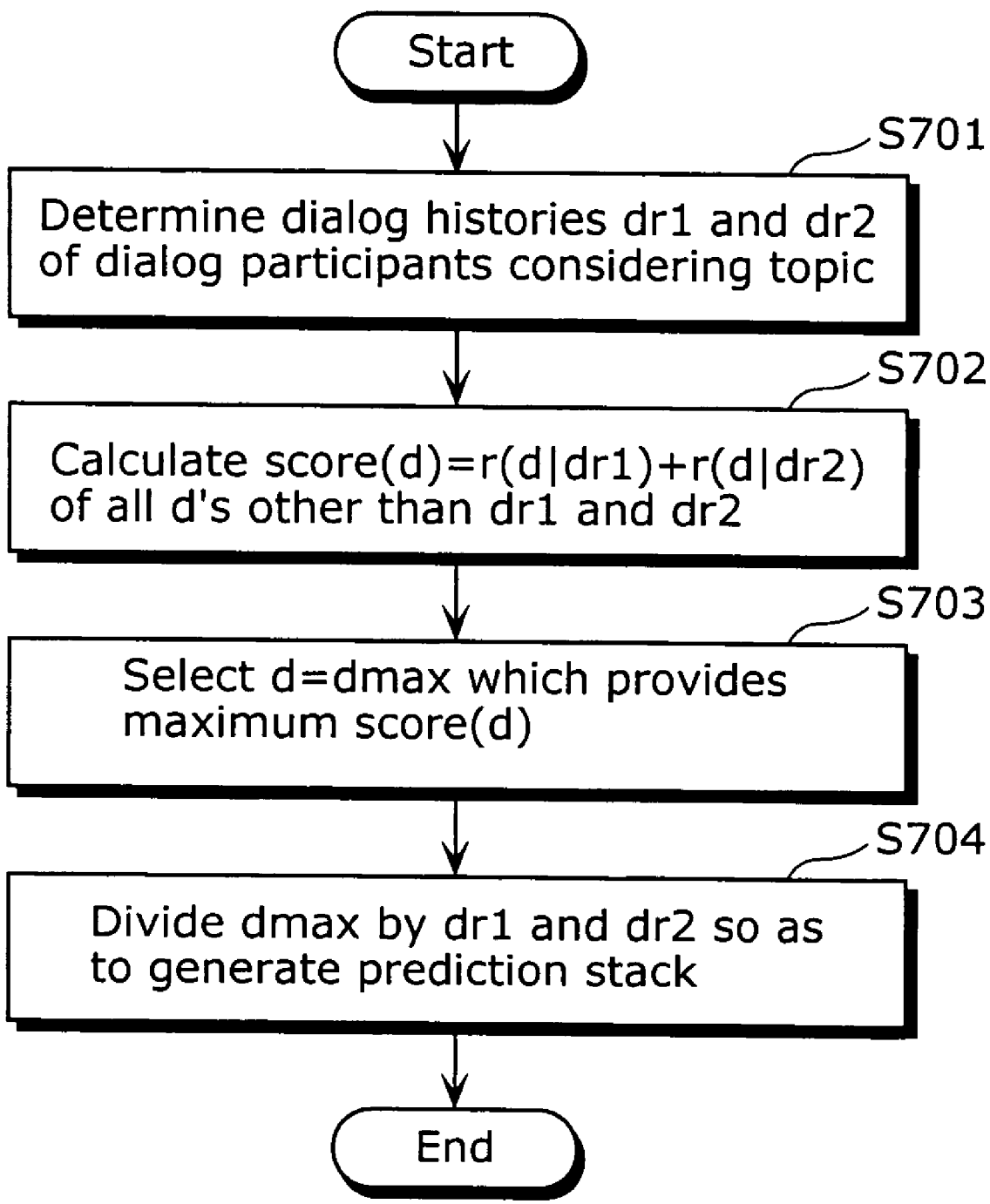
FIG. 8 is a flow chart showing the operation flow of the dialog history selection unit.

FIG. 8 is a flow chart showing the operation flow of the dialog history selection unit 107. The dialog history selection unit 107 determines the dialog history dr1 of the dialog participant 1 and the dialog history dr2 of the dialog participant 2 which are included in the dialog history database 201, based on the information concerning the authentication information of the dialog participants and the topic of the dialog which have been notified by the utterance prediction unit 106 (Step S701). In other words, the dialog history dr1 is determined by searching the dialog history corresponding to the authentication information of the dialog participant 1 and the topic of the dialog, and the dialog history dr2 is determined by searching the dialog history corresponding to the authentication information of the dialog participant 2 and the topic of the dialog. For example, in the case where a dialog history shown in one of FIGS. 3A to 3E is included in the dialog history database 201, it is determined that the dialog history dr1 is the dialog history d1 and the dialog history dr2 is the dialog history d3. This is because the utterances assigned with J in the dialog history d1 are Taro's, the utterances assigned with E in the dialog history d3 are Hanako's, and the topic of the dialog relates to a hotel. The dialog history d5 is not selected because the topic of the dialog relates to a rented car while the utterances assigned with J in the dialog history d5 are Taro's. In the case where there is no corresponding dialog history in the dialog history database 201, it should be noted that the processing can be continued by searching the most similar dialog history disregarding the topic of the dialog.

Next, the dialog history selection unit 107 calculates scores, which can be obtained by the equation of "score(d)=r (d|dr1)+r(d|dr2)", of the dialog histories d's other than the dialog histories dr1 and dr2 which are included in the dialog history database 201 (Step S702). Here, r(da|db) is a degree of similarity of the dialog history da to the dialog history db, and the degree of similarity is defined by the following equation 801 shown in FIG. 9A. An assembly of successive utterances is defined as utterance block. Additionally, size(d) is the number of utterance blocks included in the dialog history, and size(b) is the number of utterances included in the utterance block b. For example, in an example of calculating a degree of similarity 802 in FIG. 9, since the dialog history da is made up of four utterance blocks, size(da) is 4. In addition, since as for the numbers of the utterances included in the respective utterance blocks, size(b1) is 5, size(b2) is 2, size(b3) is 4, and size(b4) is 1. Thus, r(da|db) is approximately 0.424. According to the above equation, the greater the value of a degree of similarity r, the higher the degree of similarity of a dialog history becomes. In addition, a degree of similarity is proportional to the mean of the numbers of utterances included in the respective assemblies, and a degree of similarity becomes greater in proportion to an increase in the number of utterances included in an utterance block.

Figure 11:
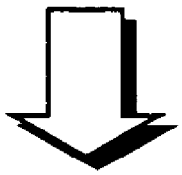
FIG. 11 is a diagram showing an example where the dynamic programming is applied to the dialog history d4.

FIG. 10 is a diagram showing an algorithm of a dynamic programming for adjusting the number of utterances in a dialog history. The calculation of the earlier-mentioned degree of similarity is performed after adjusting the numbers of utterances of the two dialog histories to the same number using this dynamic programming. FIG. 11 shows an example where the dynamic programming of FIG. 10 is applied to the dialog history d4 in order to calculate a degree of similarity r(d4|d1) of the dialog history d4 to the dialog history d1. In the adjusted dialog history d4', the utterances assigned with a label of $\phi$ are empty utterances added so as to adjust the number of utterances in the dialog history d4' to the number of utterances in the dialog history d1. The degree of similarity r(d4|d1) is calculated as the value of the degree of similarity r(D4'|d1).

Figure 12:
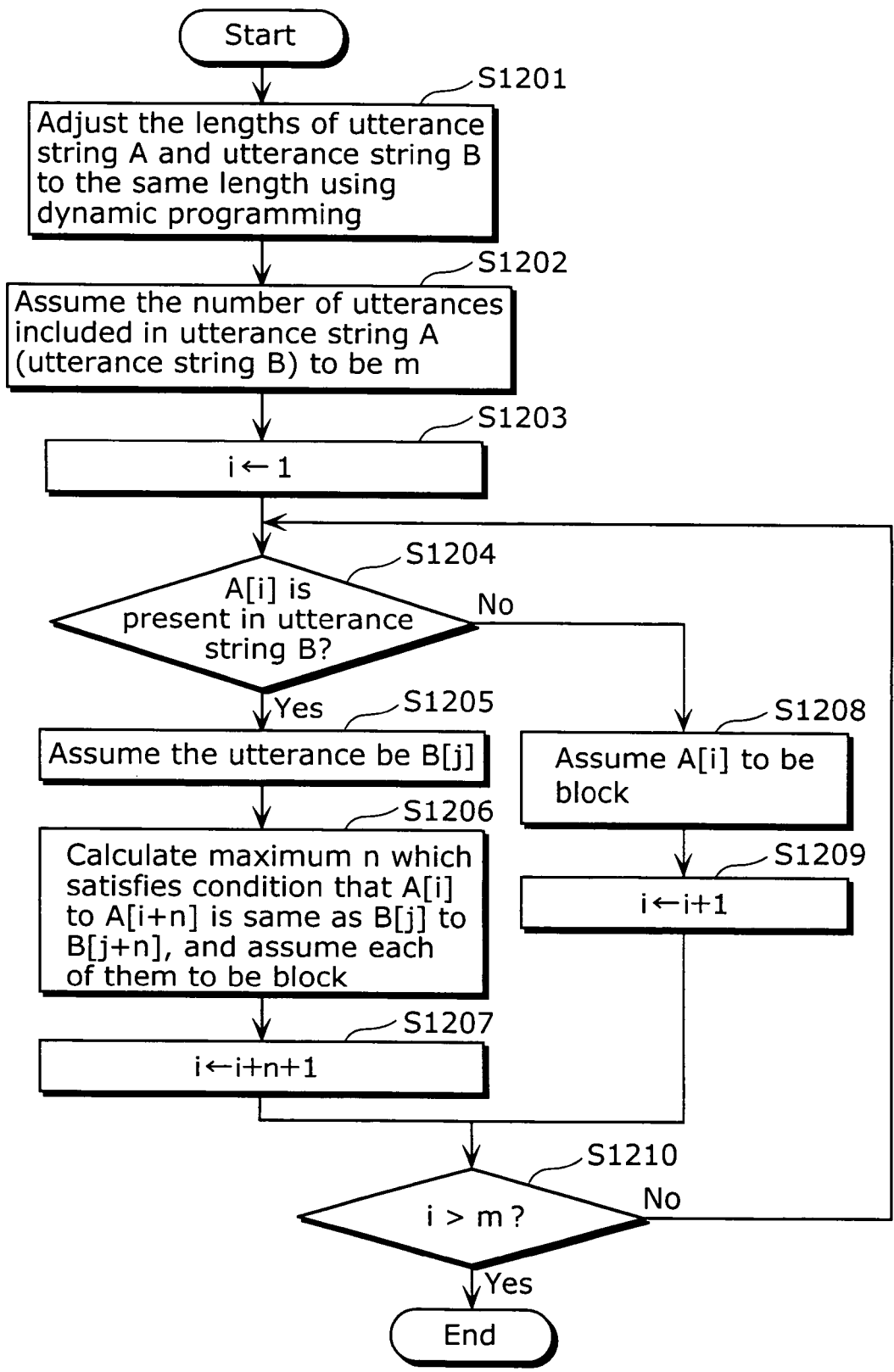
FIG. 12 is a diagram showing an algorithm for determining a block of utterances.

FIG. 12 is a diagram showing an algorithm for determining utterance blocks. Basically, utterance blocks are determined so that the numbers of the utterance blocks included in the two dialog histories become a minimum.

First, the length of the utterance string A and the length of the utterance string B are adjusted to the same length using the dynamic programming (Step S1201). The number of utterances included in the utterance string A (utterance string B) is assumed to be m (Step S1202). Next, 1 is substituted to i (Step S1203). Whether or not A[i] is present in the utterance string B is judged (Step S1204). Note that A[i] shows the ith utterance in the utterance string A. In addition, as for $\phi$, when A[i]=$\phi$ and B[j]=$\phi$, it is not regarded as A[i] equals to B[j]. As a result of this judgment, in the case where A[i] is present in the utterance string B (Step S1204: YES), the utterance is assumed to be B[j] (Step S1205). After that, the maximum n which satisfies the condition that utterances A[i] to A[i+n] is the same as utterances B[j] to B[j+n] is obtained, and each of them is assumed to be a block (Step S1206). Next, i+n+1 is substituted to i (Step S1207).

In the case where the judgment on whether or not A[i] is present in the utterance string B showed that A[i] is not present in the utterance string B (Step S1204: NO), A[i] is assumed to be a block (Step S1208). After that, i+1 is substituted to i (Step S1209).

Next, whether i>m or not is judged (Step S1210). In the case where the judgment showed that i is not greater than m (Step S1207: NO), the processing step of judging whether or not A[i] is present in the utterance string B and the following processing steps (Steps S1204 to S1207) are repeated. On the other hand, in the case where the judgment showed that i is greater than m (Step S1207: YES), the processing is completed.

For example, in FIG. 9B, the dialog history da: u1, u2, u3, u4, u5, u6, u7, u8, u9, u10, u11 and u12 become da: (u1, u2, u3, u4 and u5), (u6 and u7), (u8, u9, u10 and u11) and u12 to the dialog history db: u6, u7, u1, u2, u3, u4, u5, u6, u7, u8, u9, u10, u11 and u12. The utterances assigned with a label which are enclosed by a pair of parentheses correspond to a single utterance block. Note that the utterance block made up of only a single utterance is not enclosed by parentheses in order to simplify the transcription.

Figure 13:
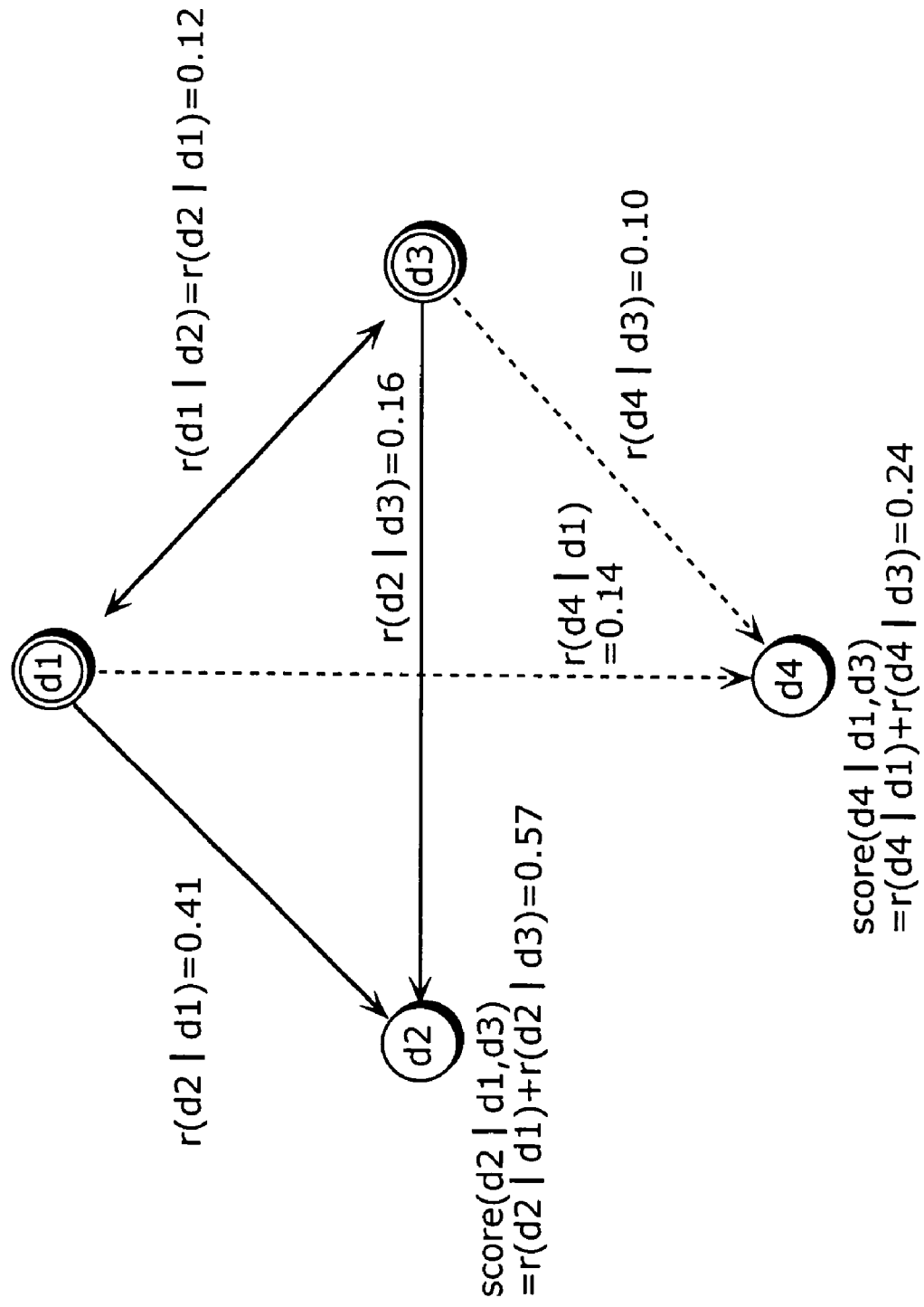
FIG. 13 is a diagram showing the results obtained by calculating the scores of dialog histories.

FIG. 13 is a diagram showing that the dialog history database 201 stores the dialog histories shown in FIGS. 3A to 3E and that the results of calculating the scores, each of which is obtained by the equation of "score(d)=r(d|dr1)+r(d|dr2)", of all the dialog histories d's other than the dialog history dr1 and the dialog history dr2, when the dialog history dr1=the dialog history d1, and the dialog history dr2=the dialog history d3.

Next, the dialog history selection unit 107 selects the dialog history d=the dialog history dmax which provides the maximum score(d) (Step S703). In the case of the example shown in FIG. 13, the dialog history d2 is selected.

The dialog history selection unit 107 applies the algorithm for determining utterance blocks shown in FIG. 12 to the dialog history dmax as well as the dialog history dr1 and the dialog history dr2, divides the dialog history dmax into utterance blocks so as to generate a prediction stack (Step S704). In the processing of identifying a continuous string of utterances (Step S1206), it should be noted that a restriction that no continuous string of utterances can be made over a boundary between predetermined utterance blocks. For example, in the case where the dialog history dmax=the dialog history d2 is divided into the dialog history dr1=the dialog history d1 and the dialog history dr2=the dialog history d3, the dialog history d2: E1; E8; J2; E3; J4; E5; J6 and E7 is divided by the dialog history d1 first into three utterance blocks of the dialog history d2: E1; E8; and (J2; E3; J4; E5; J6 and E7). The three utterance blocks are further divided by the dialog history d3 next into five utterance blocks of the dialog history d2: E1; E8; J2, (E3 and J4), and (E5, J6 and E7). The dialog history selection unit 107 notifies the utterance prediction unit 106 of this dialog history d2 as a prediction stack.

In the algorithm for determining utterance blocks shown in FIG. 12 performed by the dialog history selection unit 107, the processing for judging whether or not an utterance is included in both of the two dialog histories is made (Steps S1204 and S1206). However, it should be noted that the judgment may be made by matching based on surface expressions (character expression) of an utterance in the processing of natural language or by matching based on content words. For example, in the case where one of the dialog history includes the utterance of

「ありがとう。」 and the other dialog history includes the utterance of

「ありがとうございます。」, it is possible to judge these utterances as the same utterance included in both the two dialog histories. This is because the surface expressions of the utterances are similar to each other even though these utterances are assigned with different utterance numbers. This is true of the case where one of the dialog histories includes the utterance of "Thank you." and the other dialog history includes the utterance of "Thank you very much.". Furthermore, here is the case where one of the dialog histories includes the utterance of

「これを 3 セット贈答用に包んでください。」 and the other dialog history includes the utterance of

「贈答用に 3 セット、これを包んでください。」

In this case, it is possible to judge these utterances as the utterance included in both the two dialog histories as long as

「これ」「包む」「3 セット」「贈答用」 are defined as content words. This is because many content words are commonly included in the dialog histories. In addition, these judgment methods may be used in combination. To employ a flexible utterance judgment like this makes it possible to search an appropriate dialog history even in the case where no appropriate dialog history can be searched only by means of matching based on utterance numbers.

Here, the flow chart shown in FIG. 5 will be described again.

After receiving an utterance prediction stack from the dialog history selection unit 107, the utterance prediction unit 106 judges whether or not each of the prediction stack is empty (Step S403). In the case where the prediction stack is empty for the reason that the dialog history selection unit 107 cannot select any appropriate dialog history in the dialog history database 201, or for another reason (Step S403: YES), the utterance prediction unit 106 completes the processing without performing any utterance prediction action.

Figure 14:
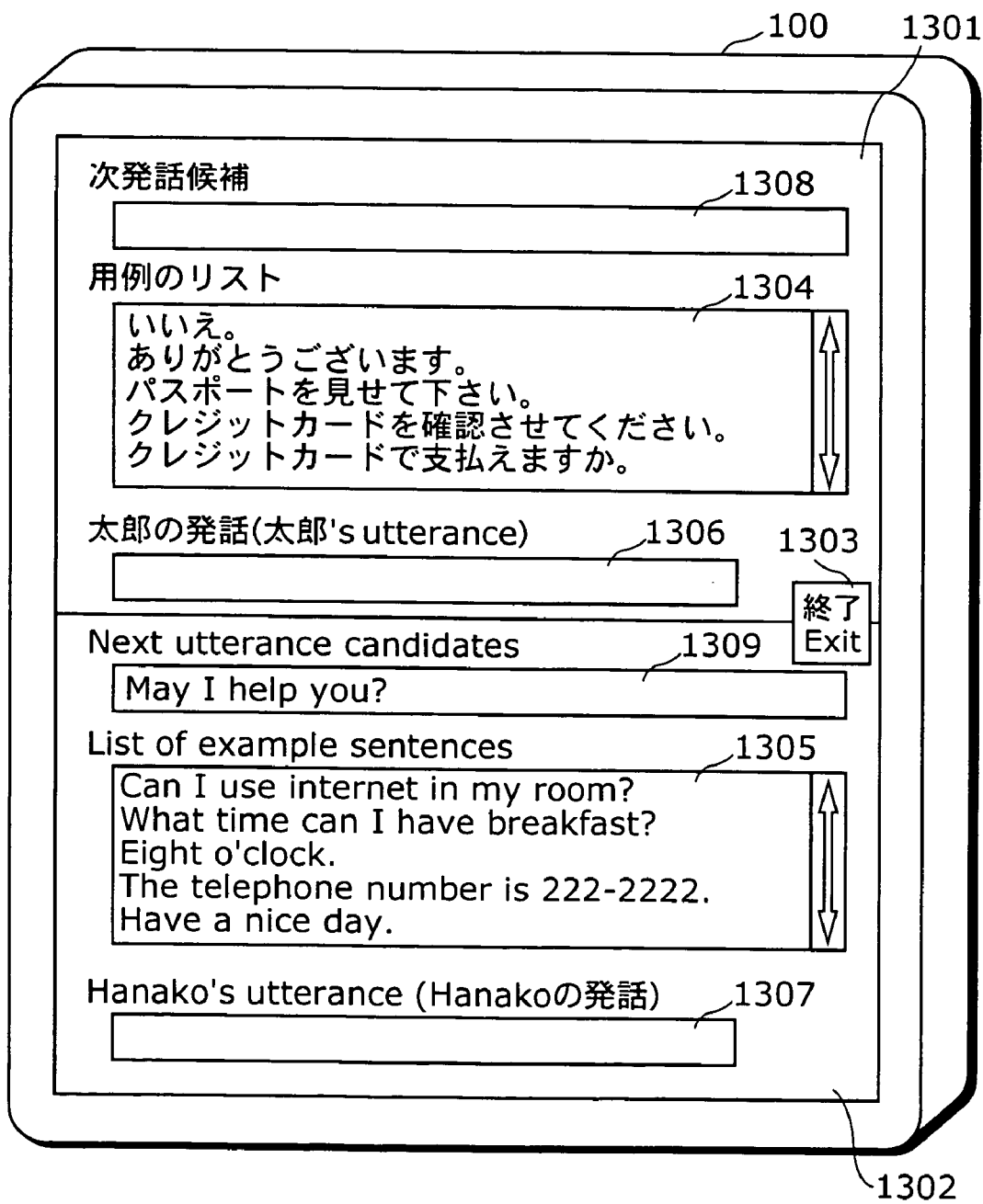
FIG. 14 is a diagram showing an example display of the dialog supporting apparatus of the present invention.

On the other hand, in the case where the prediction stack is not empty (Step S403: NO), the utterance prediction unit 106 displays the opening utterance of the prediction stack as the candidate next utterance (Step S404). FIG. 14 is a diagram showing the status of the display of the dialog supporting apparatus 100 at the time when the dialog is started. The upper half of the display area is the utterance input and output area 1301 intended for the dialog participant 1 and the lower half of the display area is the utterance input and output area 1302 intended for the dialog participant 2. An exit button 1303 is the button pressed at the time when the dialog is completed. The dialog participant 1 and the dialog participant 2 can select an arbitrary utterance from among all the utterances defined in FIG. 2, using the example usage list 1304 and the example usage list 1305, respectively, and can notify the meaning of the utterance to the other dialog participant. The utterances transformed by the utterance processing unit 105 are respectively outputted to one of the utterance outputting unit 1306 of the dialog participant 1 and the utterance outputting unit 1307 of the dialog participant 2. After that, these utterances are read out using speech synthesis processing installed in a PDA or the like at the same time when they are displayed. The utterances for the dialog participant 1 which are predicted by the utterance prediction unit 106 are displayed on the prediction display area 1308, and the utterances for the dialog participant 2 which are predicted by the utterance prediction unit 106 are displayed on the prediction display area 1309. The dialog participant 1 and the dialog participant 2 can omit the operation for searching an example usage list 1304 and an example usage list 1305 for the utterance to be selected, by selecting the utterance displayed on the prediction display area 1308 and the prediction display area 1309, respectively. In other words, the dialog participants 1 and 2 can input utterances immediately.

Figure 15:
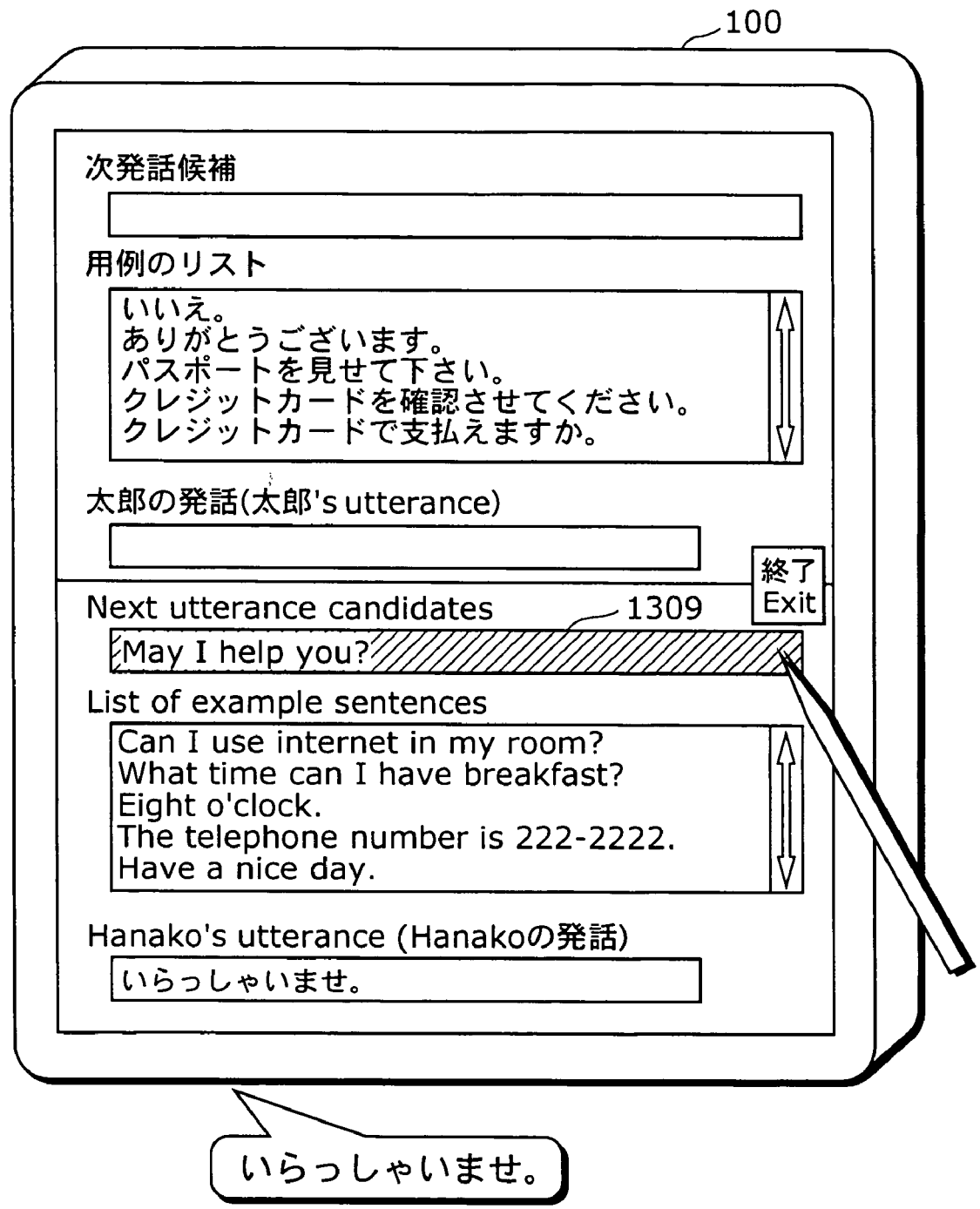
FIG. 15 is a diagram showing an example display of the dialog supporting apparatus of the present invention.

In the case where a prediction stack is generated as in the above-described case, the utterance prediction unit 106 displays the utterance of "May I help you?" which is the opening utterance in the prediction stack E1, E8, J2, (E3, J4), and (E5, J6, E7) on the prediction display area 1309. The dialog participant 2 may select an utterance from the example usage list 1305. However, since the desired utterance has already been displayed on the prediction display area 1309, the dialog participant 2 selects it as shown in FIG. 15. The utterance E1 is translated into Japanese in the utterance processing unit 102, and the utterance of

「いらっしゃいませ。」 is notified to the utterance participant 1.

At this time, the utterance prediction unit 106 judges whether or not the utterance is inputted by one of the dialog participants (Step S405). When the utterance is inputted by the dialog participant (Step S405: YES), the utterance prediction unit 106 searches the prediction stack for a matching utterance starting with the opening utterance (Step S406), and judges whether or not there is a matching utterance (Step S407). In the case where there is a matching utterance (Step S407: YES), the utterance prediction unit 106 judges whether or not the matching utterance is the opening utterance of the prediction stack (Step S408). In the case where it is the opening utterance (Step S408: YES), it deletes the opening utterance of the prediction stack so as to update the prediction stack (Step S409). On the other hand, in the case where the utterance is not the opening utterance (Step S408: NO), it moves the block including the matching utterance to the opening part of the prediction stack, deletes the matching utterance and the utterances placed before the matching utterance so as to update the prediction stack (Step S410). After that, the utterance prediction unit 106 returns to the processing of judging whether or not the prediction stack is empty (Step S403).

Figure 16:
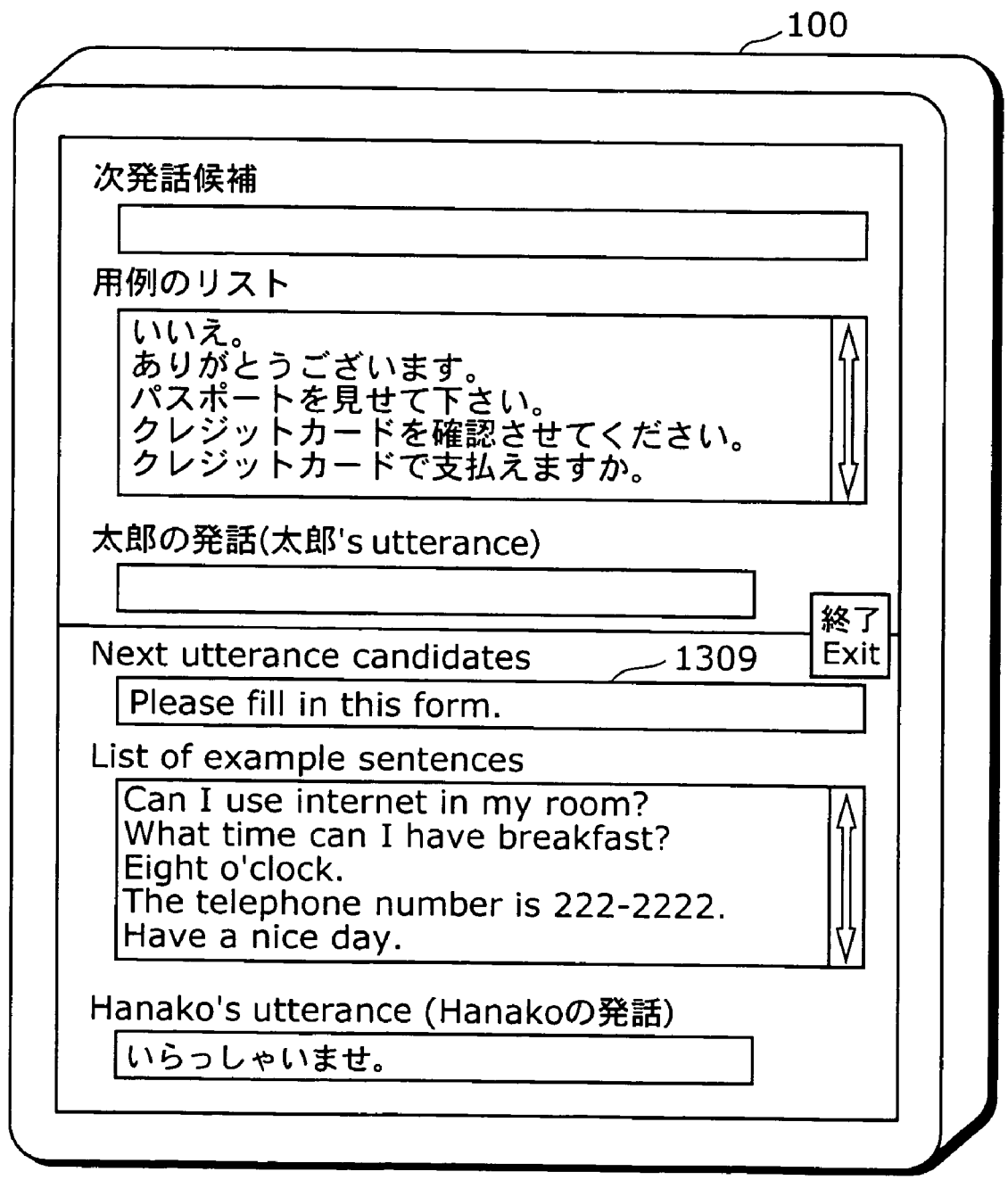
FIG. 16 is a diagram showing an example display of the dialog supporting apparatus of the present invention.

Since the utterance of a dialog participant is E1 in the above example, the prediction stack is updated to E8, J2, (E3, J4), and (E5, J6, E7). After that, it returns to the processing of judging whether or not the prediction stack is empty (Step S403). Since the prediction stack is still not empty, the opening utterance E8 of "Please fill in this form." is displayed on the prediction display area 1309 as shown in FIG. 16, and an utterance by one of the users is waited for.

Figure 17:
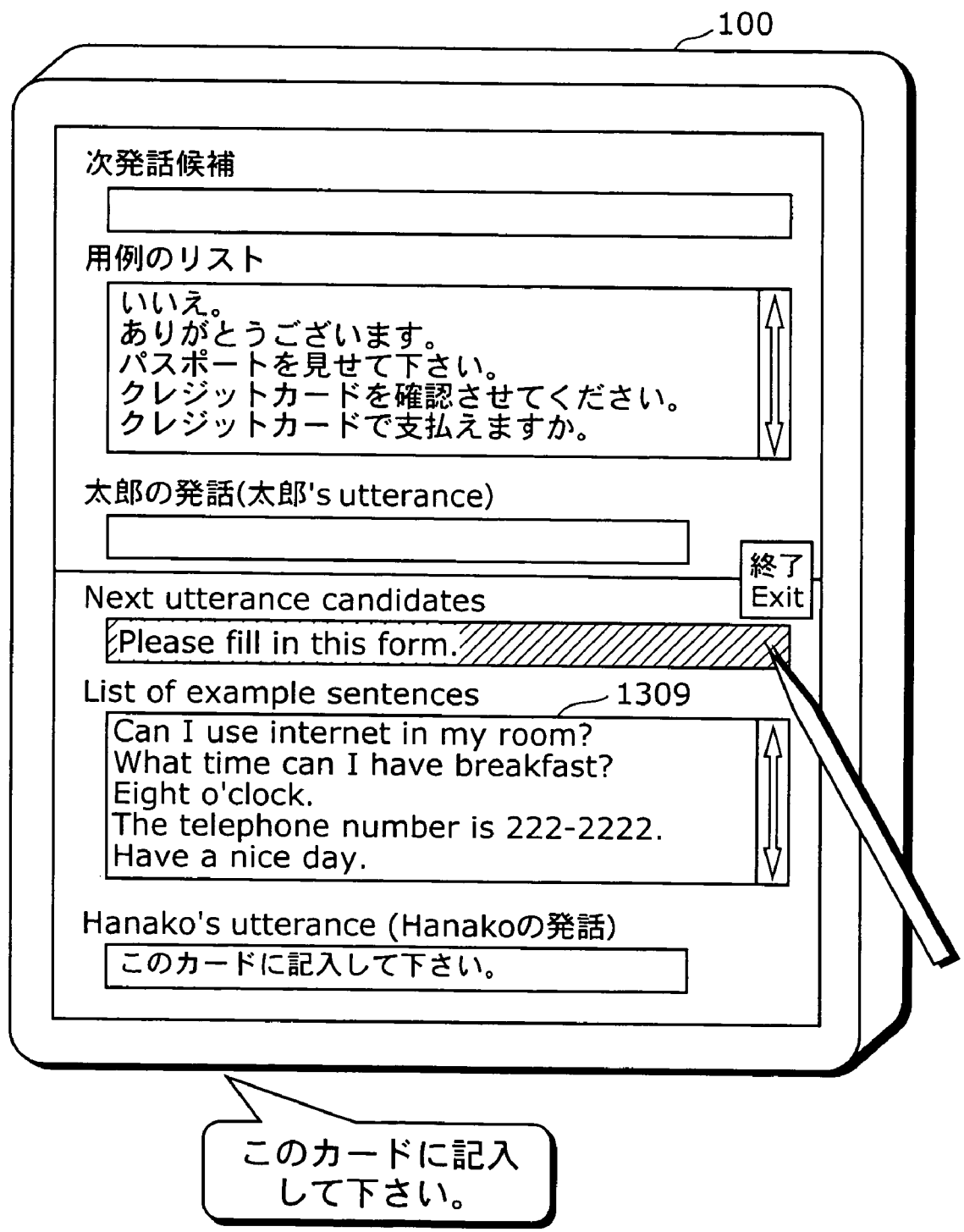
FIG. 17 is a diagram showing an example display of the dialog supporting apparatus of the present invention.

The dialog participant 2 may select an utterance from the example usage list 1305. However, the desired utterance has already been displayed on the prediction display area 1309. In the case where the dialog participant 2 selects the prediction display area 1309 as shown in FIG. 17, the opening utterance E8 is translated into Japanese by the utterance processing unit 102, and the utterance of

「このカードに記入して下さい。」 is notified to the dialog participant 1. Likewise, the utterance prediction unit 106 updates the prediction stack to J2, (E3, J4), and (E5, J6, E7), and displays the utterance J2 of

Figure 18:
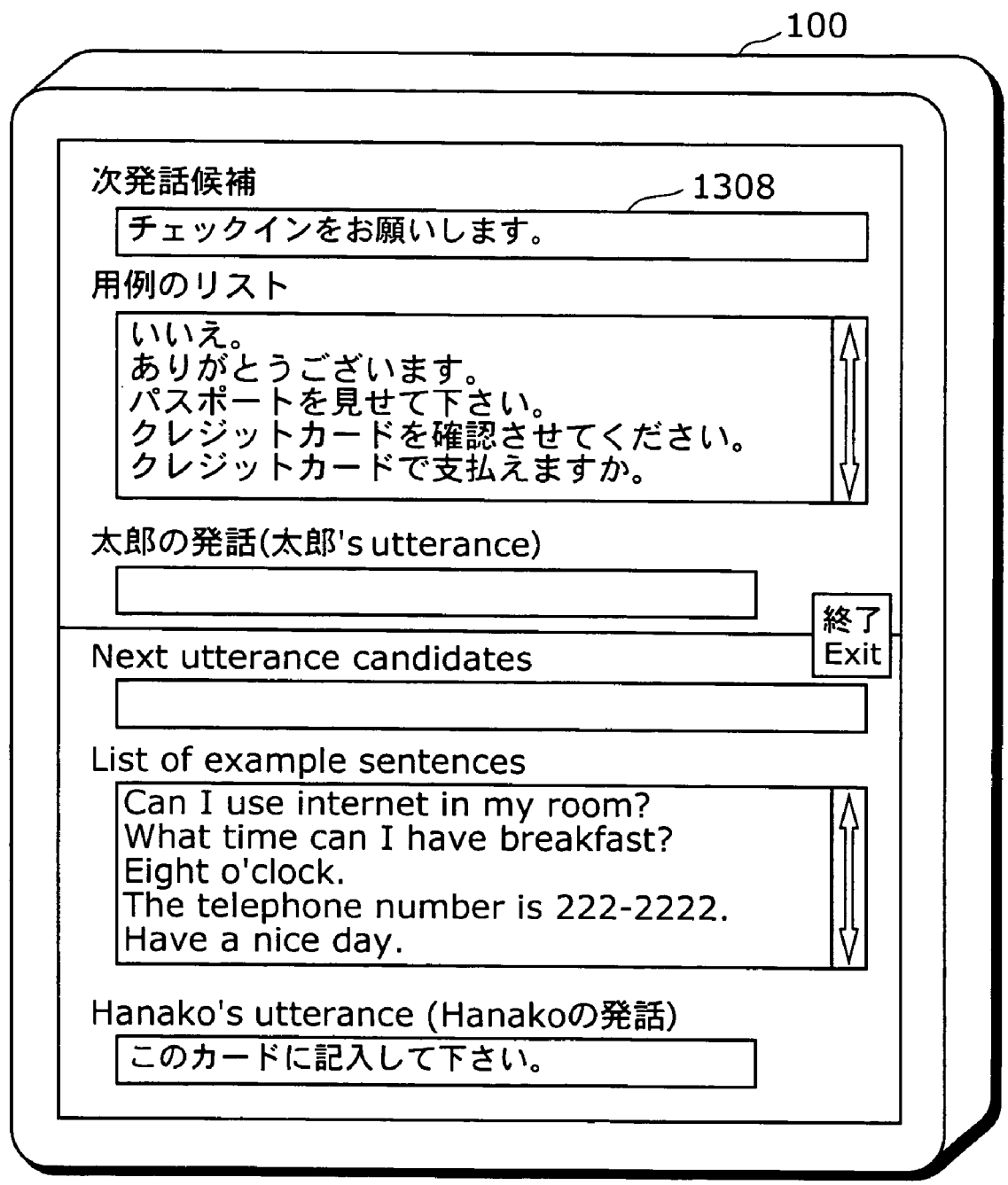
FIG. 18 is a diagram showing an example display of the dialog supporting apparatus of the present invention.

「チェックインをお願いします。」 on the prediction display area 1308 as shown in FIG. 18.

Figure 19:
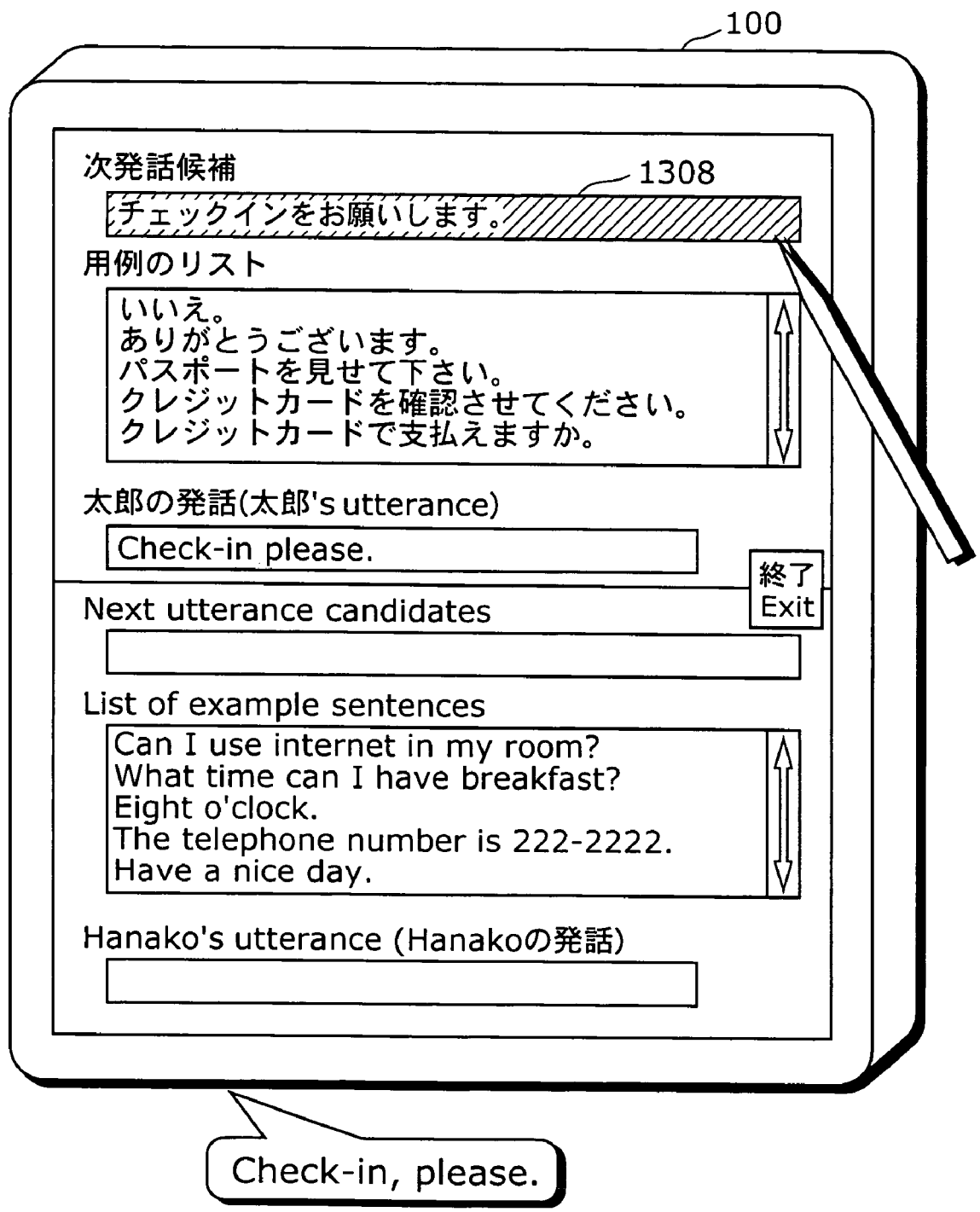
FIG. 19 is a diagram showing an example display of the dialog supporting apparatus of the present invention.

The dialog participant 1 may select an utterance from the example usage list 1304. However the desired utterance has already been displayed on the prediction display area 1308. In the case where the dialog participant 1 selects the prediction display area 1308 as shown in FIG. 19, the utterance J2 is translated into English by the utterance processing unit 102, and the utterance of "Check-in, please." is notified to the dialog participant 2. Likewise, the utterance prediction unit 106 updates the prediction stack to (E3, J4), and (E5, J6, E7), and displays the utterance E3 of "Have you made reservation?" on the prediction display area 1309. In this way, the dialog participant 1 and the dialog participant 2 do not have to search the example usage list 1304 or the example usage list 1305 for a desired utterance, and smoothly communicate their intentions with each other. Therefore, it is possible to reduce the time to complete an on-going dialog.

Figure 20:
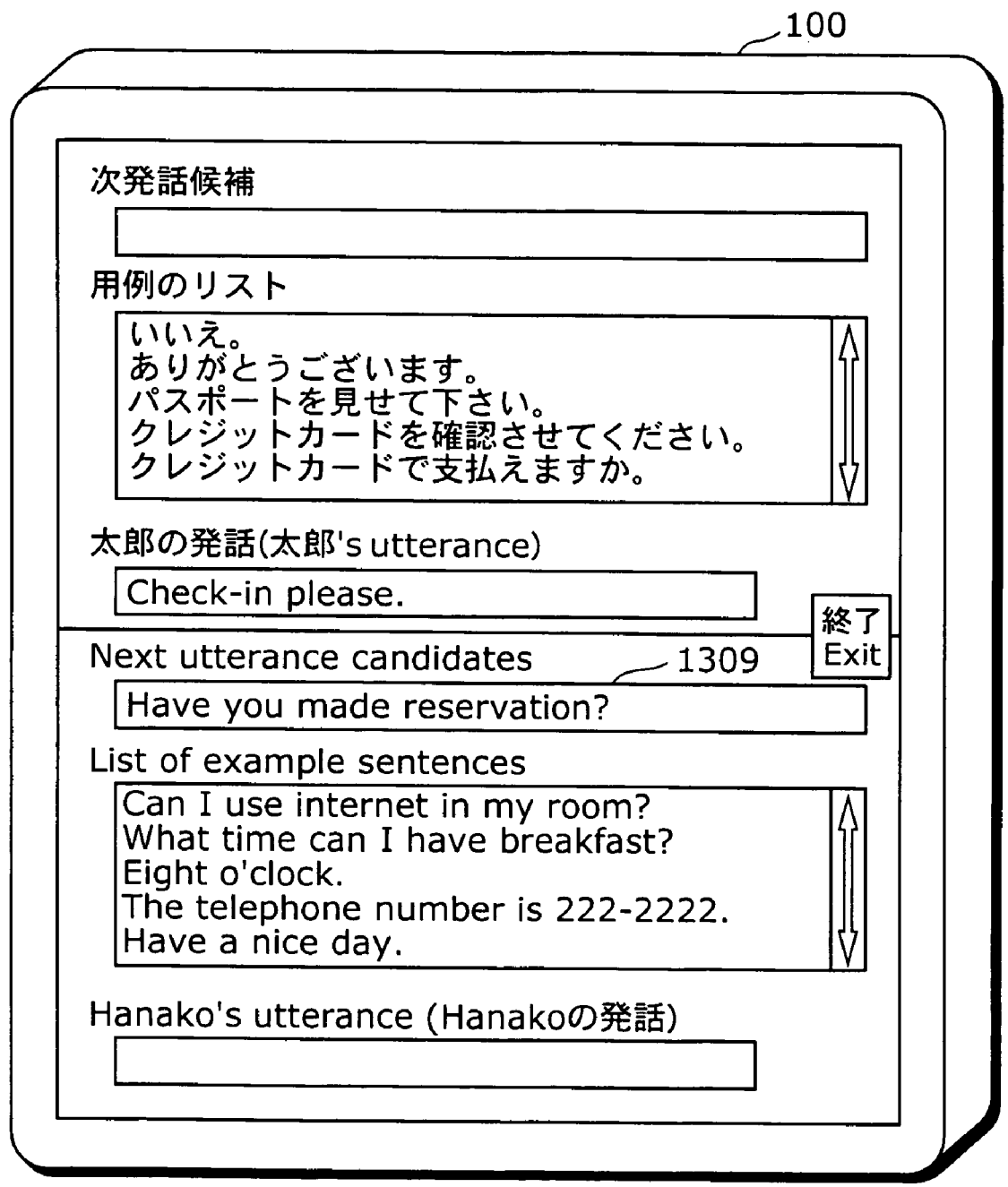
FIG. 20 is a diagram showing an example display of the dialog supporting apparatus of the present invention.
Figure 21:
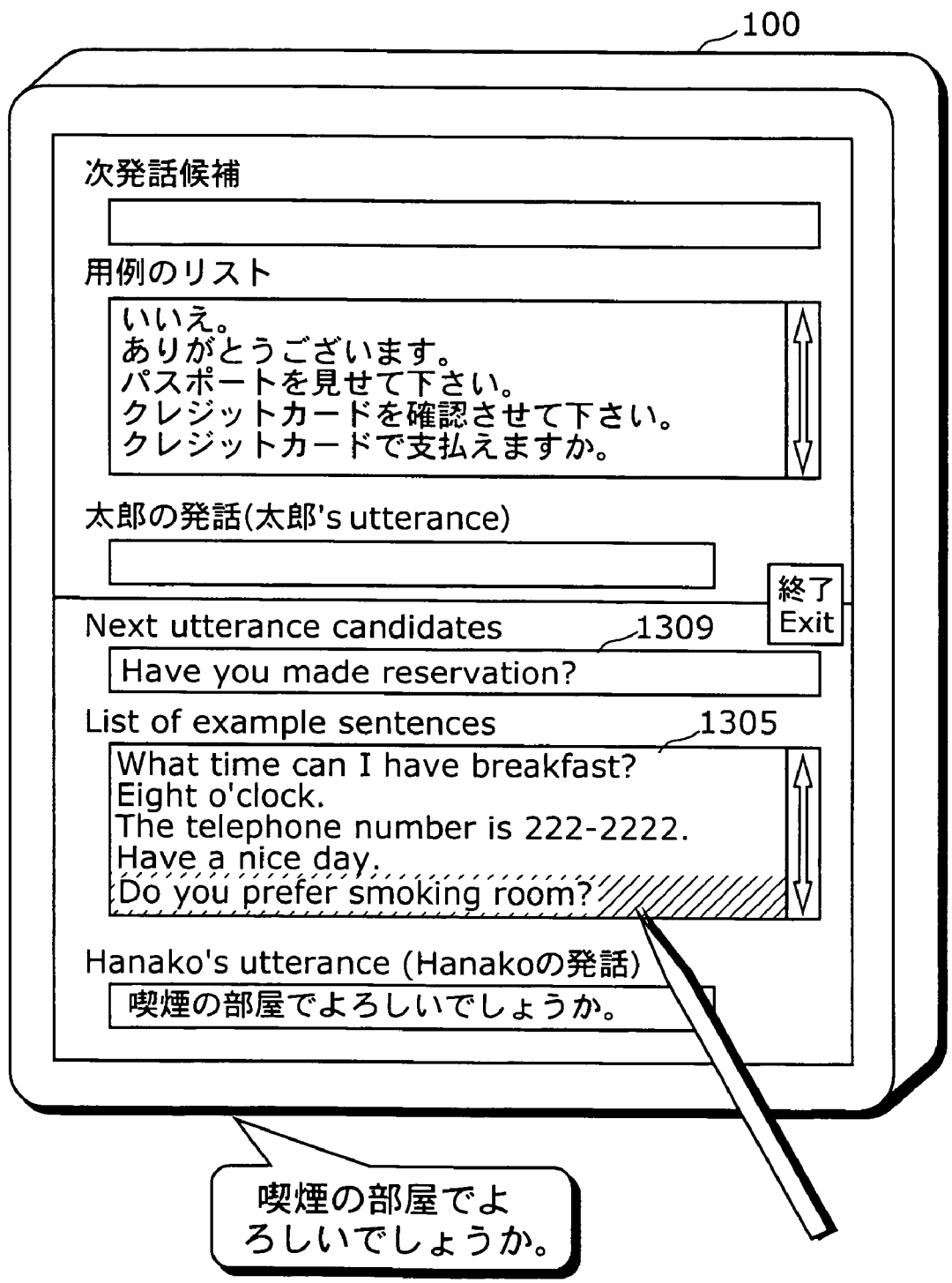
FIG. 21 is a diagram showing an example display of the dialog supporting apparatus of the present invention.

The example case described next is the case where the dialog participant 2 does not select the utterance E3 of "Have you made reservation?" which is predicted by the utterance prediction unit 106 on the prediction display area 1309 in FIG. 20, but selects the utterance E5 of "Do you prefer smoking room?" by searching the example usage list 1305 for the utterance E5 as shown in FIG. 21.

The utterance prediction unit 106 searches the prediction stack for the utterance E5, the utterance E5 is not the opening utterance of the prediction stack. Therefore, the utterance prediction unit 106 moves the utterance block including the utterance E5 to the opening part of the prediction stack so as to update the prediction stack to (E5, J6, E7), and (E3, J4). After that, it deletes the utterance E5 so as to update the prediction stack to (J6, E7), and (E3, J4). Therefore, in the processing of displaying the candidate next utterance (Step S404), the utterance J6 of

Figure 22:
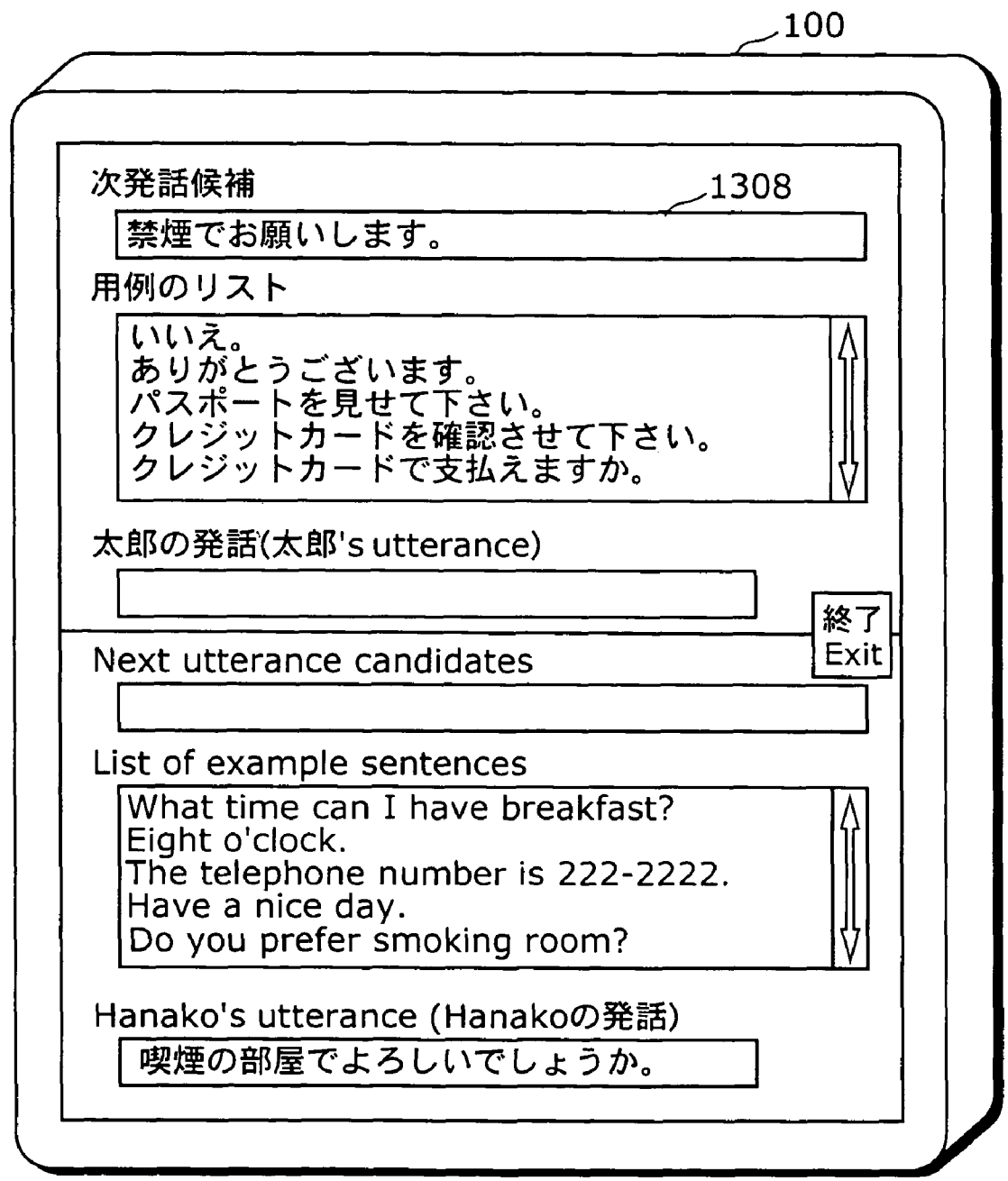
FIG. 22 is a diagram showing an example display of the dialog supporting apparatus of the present invention.
Figure 23:
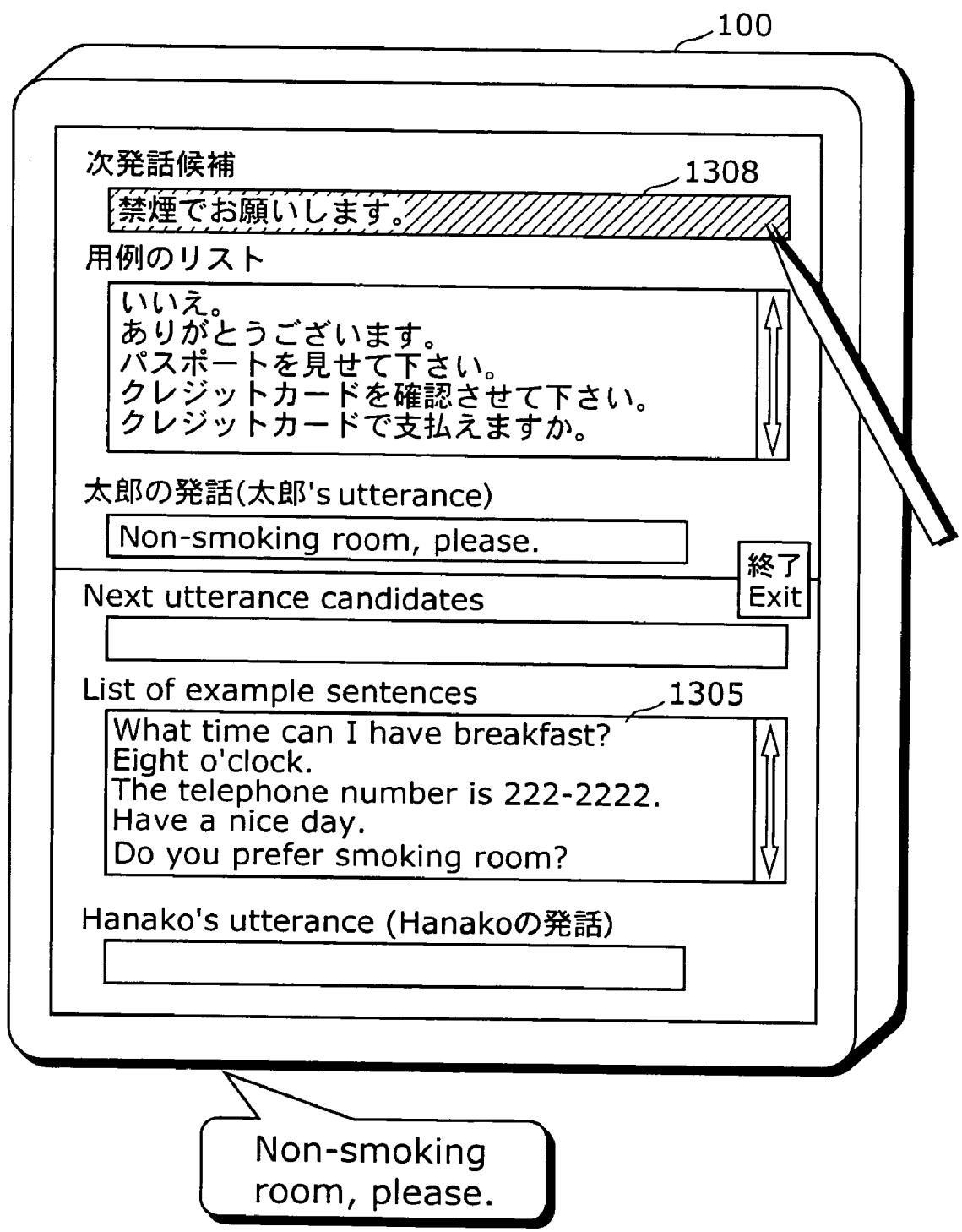
FIG. 23 is a diagram showing an example display of the dialog supporting apparatus of the present invention.

「禁煙でお願いします。」 is displayed on the prediction display area 1308 as a candidate prediction utterance as shown in FIG. 22. After that, as shown in FIG. 23, the dialog participant 1 selects the utterance J6 of

「禁煙でお願いします。」 on the prediction display area 1308 and continues the dialog smoothly. In this way, even in the case where a dialog participant does not select the utterance predicted by the utterance prediction unit 106, this embodiment makes it possible to flexibly support the dialog by predicting the future dialog which is made at the time of not selecting the predicted utterance.

Figure 24:
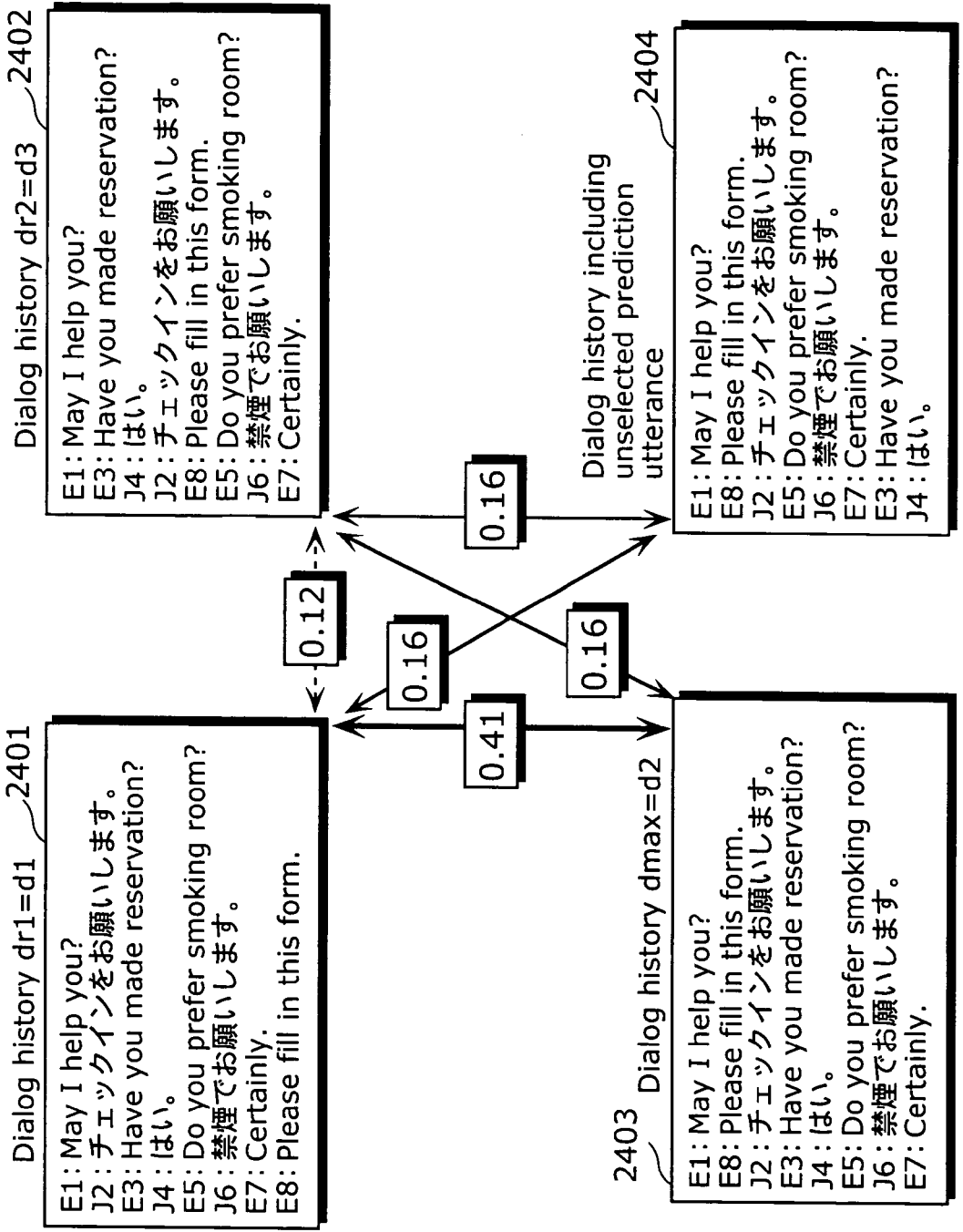
FIG. 24 is a diagram showing the comparison of the similarities between the newly generated dialogs and the dialog histories.

Here, the effect of the present invention is quantitatively verified. In general, the degree of advancement of a dialog is proportional to the degree of similarity of dialog histories of dialog participants. In order to represent a degree of similarity as a specific number, the definition of FIG. 9 is used. In the case where the dialog participant 1 and the dialog participant 2 complete the dialog by selecting only the utterances displayed on the prediction display area 1308 and the prediction display area 1309 by the utterance prediction unit 106, a dialog history 2403 shown in FIG. 24 is formed. The dialog history 2403 is equivalent to the dmax (the dialog history d2 in FIG. 3) determined by the dialog history selection unit 107. The degree of similarity between the dialog history 2401 of the dialog participant 1 (the dialog history dr1 determined by the dialog history selection unit 107, that is, the dialog history d1 in FIG. 3A) and the dialog history 2402 of the dialog participant 2 (the dialog history dr2 determined by the dialog history selection unit 107, that is, the dialog history d3 in FIG. 3B) is 0.12. Compared to this, the degree of similarity between the dialog history 2403 and the dialog history 2401 is 0.41, and the degree of similarity between the dialog history 2403 and the dialog history 2402 is 0.16. Considering this, it is obvious that the dialog according to the prediction for which dmax is used will advance more smoothly than the dialog according to one of the dialog history dr1 and the dialog history dr2. In addition, in FIG. 20, in the case where the dialog participant 2 continues and completes the dialog without selecting utterances predicted by the utterance prediction unit 106, the dialog history 2404 is formed. The degree of similarity of the dialog history 2404 and the dialog history 2401 is 0.16, and the degree of similarity of the dialog history 2404 and the dialog history 2402 is 0.16. Considering this, it is obvious also in this use that the dialog according to one of the dialog history dr1 and the dialog history dr2 will advance more smoothly than the dialog according to the prediction for which dmax is used.

The already-described case is the case of assuming that the dialog participant 1 speaks Japanese and the dialog participant 2 speaks English in the dialog supporting system. Here will be described the case of assuming that the dialog participant 1 speaks Chinese and the dialog participant 2 speaks English. FIG. 25 is a diagram showing an example of the interrelationship between the utterance numbers, the utterances of the dialog participant 1 and the utterances of the dialog participant 2.

The utterance receiving unit 101 transforms the received utterance of the dialog participant 1 into the corresponding utterance information. The utterance information is, for example, an utterance number in FIG. 2. The utterance processing unit 105 translates the utterance (Chinese) of the dialog participant 1 into the corresponding utterance (English) of the dialog participant 2, and outputs the corresponding character string. For example, in the case where the utterance number 1 is inputted, the utterance processing unit 105 outputs the character string of "May I help you?" to the utterance outputting unit 104 as the utterance information.

In contrast, the utterance receiving unit 103 translates the received utterance of the dialog participant 2 into the corresponding utterance information. The utterance information is, for example, an utterance number. The utterance processing unit 105 transforms the utterance (English) of the dialog participant 2 into the corresponding utterance (Chinese) of the dialog participant 1 and outputs the character string. For example, in the case where the utterance number 1 is inputted, the utterance processing unit 105 outputs the following character string to the utterance outputting unit 102 as the utterance information.

欢迎光临。

After that, in order to simplify the following description considering the language directions, the utterance number 1 inputted by the dialog participant 1 is abbreviated as C1 and the utterance number 1 inputted by the dialog participant 2 is abbreviated as E1.

The utterance receiving unit 101 allows the dialog participant 1 to directly select an utterance from the list of Chinese utterances in FIG. 25, and outputs the utterance number as the utterance information. In addition, the utterance receiving unit 103 allows the dialog participant 2 to directly select an utterance from the list of English utterances in FIG. 25, and outputs the utterance number as the utterance information. As for the configuration of the utterance receiving unit 101 or the utterance receiving unit 103, it may be realized by the processing of projecting the speech of a dialog participant to one of the utterance numbers using a speech recognition processing. In addition, it is realized by the processing of allowing a dialog participant to input a transcription or a character string corresponding to the pronunciation of the utterance through a keyboard and projecting the speech to one of the utterance numbers.

Each of FIGS. 26A to 26E is a diagram showing an example of a dialog history stored in the dialog history database 201. A dialog history is a history of utterances made in the past by dialog participants, and in the dialog history the utterances of the dialog participants are placed in time sequence. Each utterance corresponds to one of the utterances defined in FIG. 25. There is a need to distinguish even the same utterance number depending on a dialog participant. Thus, C is assigned to the utterances made in Chinese and E is assigned to the utterances made in English, and the C and E each is defined as a label of the utterance in the dialog history. After that, in order to simplify the following description, a dialog history is described using column labels. For example, the dialog history d6 is described as d6: E1, C2, E3, C4, E5, C6, E7 and E8. The authentication information of the dialog participants who made the dialog and the topic of the dialog (the situation of the dialog) are recorded in the dialog history. For example, information indicating that the utterances assigned with C are Taro's, the utterances assigned with E are Tom's, and the topic relates to a hotel.

As shown in FIG. 4, here will be described an example case where the dialog participant 1 is a traveler who speaks Chinese, the dialog participant 2 is a clerk of a hotel who speaks English, and the topic for the dialog is to check in the hotel. Note that the operation flows of the utterance prediction unit 106 and the dialog history selection unit 107 are the same as the operation flows described above. Thus, they will be described with reference to flow charts shown in FIG. 5 and FIG. 8, but the descriptions of the same parts are omitted here.

Figure 27:
FIG. 27 is a diagram showing an example display of the dialog supporting apparatus of the present invention.

The utterance prediction unit 106 identifies the dialog participants and the topic of the dialog which are needed for predicting utterances first (Step S401). For example, in the dialog supporting apparatus 100 which is realized as a PDA or the like as shown in FIG. 27, the information concerning the dialog participants is obtained by allowing the participants to input directly through a touch panel the names of the dialog participant

参与对话的人

1 and the dialog participant

参与对话的

2, and the topic

对谈的话题 of the dialog.

When the dialog start button

开始对谈

Figure 28:
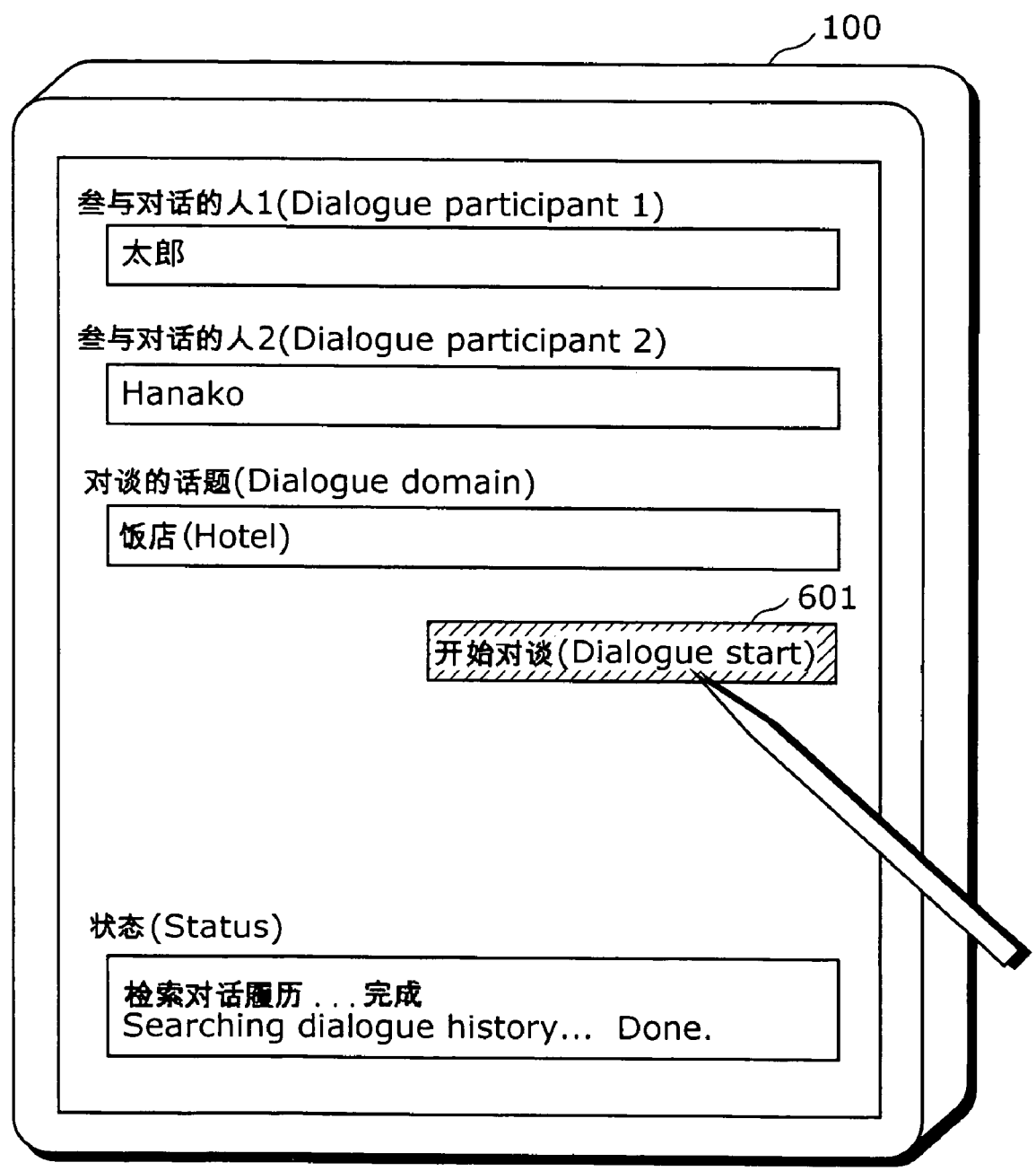
FIG. 28 is a diagram showing an example display of the dialog supporting apparatus of the present invention.

601 is pressed as shown in FIG. 28, the utterance prediction unit 106 requests the dialog history selection unit 107 to generate a prediction stack (Step S402).

The dialog history selection unit 107 determines the dialog history dr1 of the dialog participant 1 and the dialog history dr2 of the dialog participant 2 which are included in the dialog history database 201, based on the information concerning the authentication information of the dialog participants and the topic of the dialog which are notified by the utterance prediction unit 106 (Step S701). For example, in the case where a dialog history shown in one of FIGS. 26A to 26E is present in the dialog history database 201, it is determined that the dialog history dr1 is the dialog history d6 and the dialog history dr2 is the dialog history d8. This is because the utterances assigned with C in the dialog history d6 are Taro's, the utterances assigned with E in the dialog history d8 are Hanako's, and the topic of the dialog relates to a hotel. The dialog history d5 is not selected because the topic of the dialog relates to a rented car while the utterances assigned with J in the dialog history d5 are Taro's.

Next, the dialog history selection unit 107 calculates scores, which can be obtained by the equation "score(d)=r(d|dr1)+r(d|dr2)", of the dialog histories d's other than the dialog histories dr1 and dr2 which are included in the dialog history database 201. After that, the dialog history selection unit 107 selects the dialog history d=the dialog history dmax which provides the maximum score(d) (Step S703). Here, the dialog history d7 is assumed to be selected.

The dialog history selection unit 107 applies the algorithm for determining the utterance blocks of FIG. 12 to the dialog history dmax as well as the dialog history dr1 and the dialog history dr2, divides the dialog history dmax into utterance blocks so as to generate a prediction stack (Step S704). For example, in the case where the dialog history dmax=the dialog history d7 is divided into the dialog history dr1=the dialog history d6 and the dialog history dr2=the dialog history d8, the dialog history d7: E1; E8; C2; E3; C4; E5; C6 and E7 is divided by the dialog history d6 first into three utterance blocks of the dialog history d7: E1; E8; and (C2; E3; C4; E5; C6 and E7). The three utterance blocks are further divided by the dialog history d8 next into five utterance blocks of the dialog history d7: E1; E8; C2, (E3 and C4), and (E5, C6 and E7). The dialog history selection unit 107 notifies the utterance prediction unit 106 of this dialog history d7 as a prediction stack.

The utterance prediction unit 106 which received an utterance prediction stack generated in this way from the dialog selection unit 107 judges whether or not each of the prediction stacks is empty (Step S403). In the case where the prediction stack is empty for the reason that the dialog history selection unit 107 cannot select any appropriate dialog history in the dialog history database 201 or for another reason (Step S403: YES), the utterance prediction unit 106 completes the processing without performing any utterance prediction action.

Figure 29:
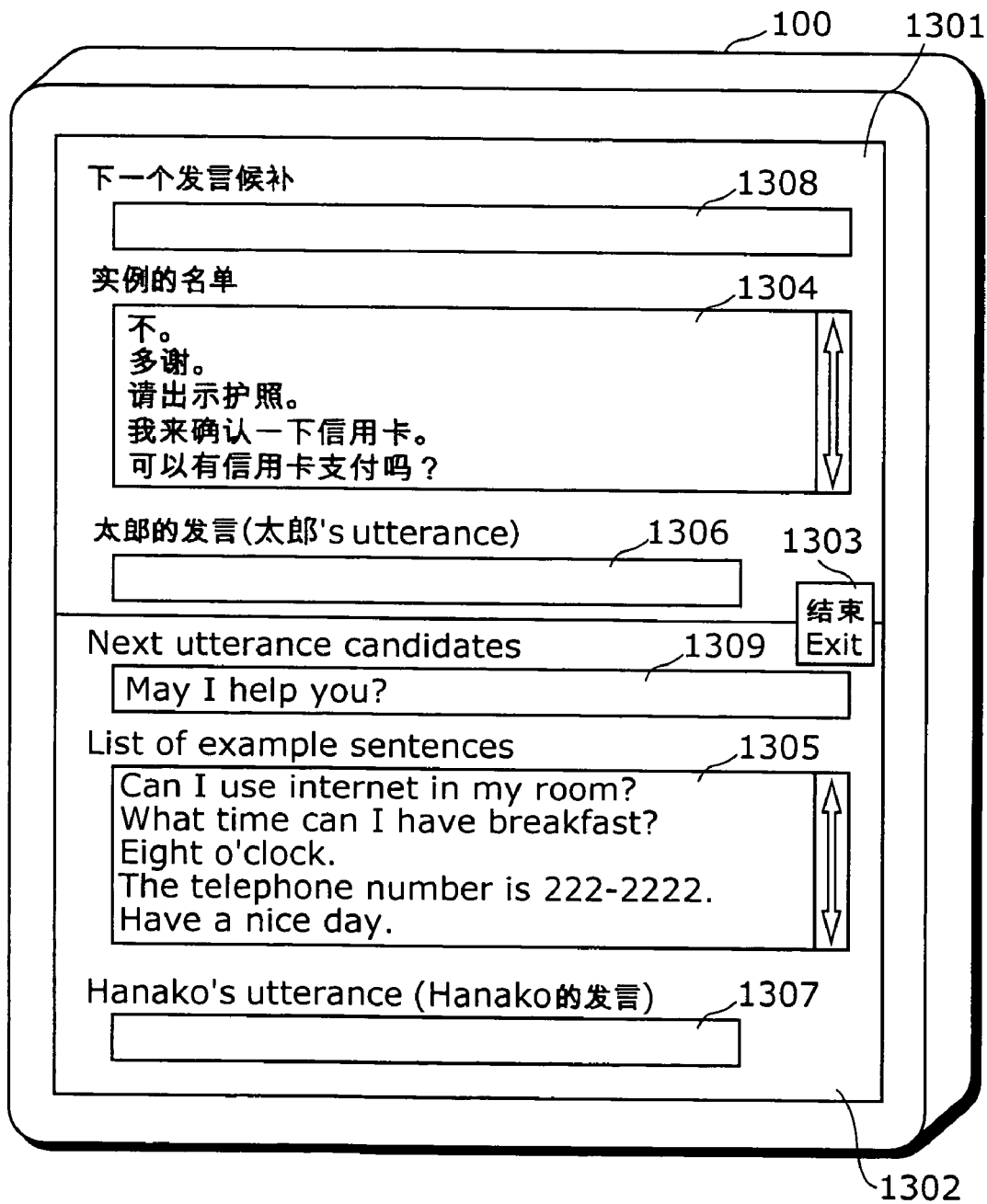
FIG. 29 is a diagram showing an example display of the dialog supporting apparatus of the present invention.

On the other hand, in the case where the prediction stack is not empty (Step S403: NO), the utterance prediction unit 106 displays the opening utterance of the prediction stack as the candidate next utterance (Step S404). FIG. 29 is a diagram showing the status of the display of the dialog supporting apparatus 100 at the time when the dialog is started. The upper half of the display area is the utterance input and output area 1301 intended for the dialog participant 1 and the lower half of the display area is the utterance input and output area 1302 intended for the dialog participant 2. An exit

结束 button 1303 is the button pressed when the dialog is completed. The dialog participant 1 and the dialog participant 2 can select an arbitrary utterance from among all the utterances defined in FIG. 25 using the example usage list 1304 and the example usage list 1305, respectively, and can notify the meaning of the utterance to the other dialog participant. The utterances translated by the utterance processing unit 105 are respectively outputted to one of the utterance outputting unit 1306 of the dialog participant 1 and the utterance outputting unit 1307 of the dialog participant 2. After that, these utterances are read out using speech synthesis processing installed in a PDA or the like at the same time when they are displayed. The utterances for the dialog participant 1 which are predicted by the utterance prediction unit 106 are displayed on the prediction display area 1308, and the utterances for the dialog participant 2 which are predicted by the utterance prediction unit 106 are displayed on the prediction display area 1309. The dialog participant 1 and the dialog participant 2 can omit the operation for searching an example usage list 1304 and an example usage 1305 for the utterance to be selected, by selecting the utterances displayed on the prediction display area 1308 and the prediction display area 1309, respectively. In other words, the dialog participants 1 and 2 can input utterances immediately.

Figure 30:
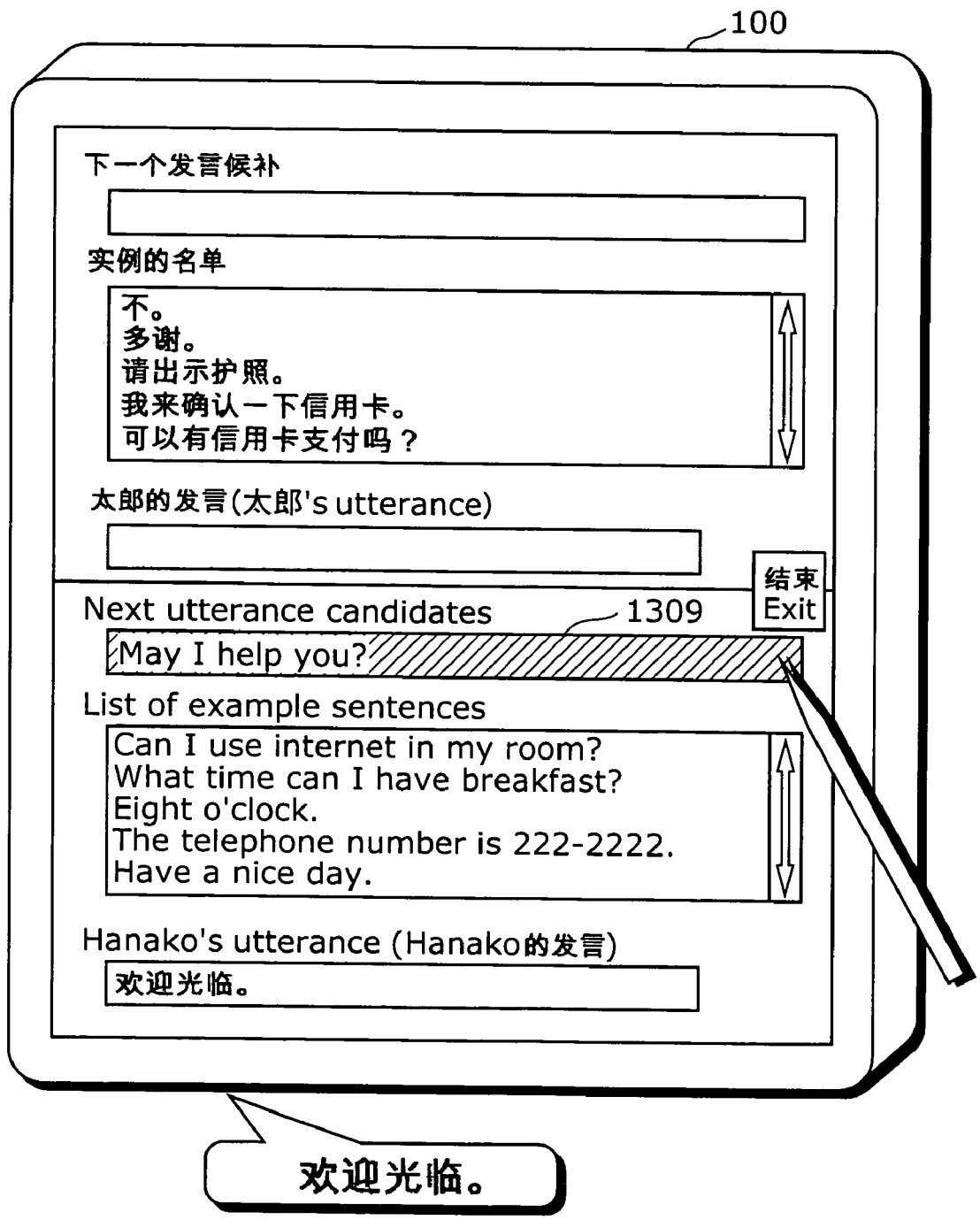
FIG. 30 is a diagram showing an example display of the dialog supporting apparatus of the present invention.

In the case where a prediction stack is generated as in the above-described case, the utterance prediction unit 106 displays the utterance of "May I help you?" which is the opening utterance in the prediction stack E1, E8, C2, (E3, C4), and (E5, C6, E7) on the prediction display area 1309. The dialog participant 2 may select an utterance from the example usage list 1305. However, since the desired utterance has already been displayed on the prediction display area 1309, the dialog participant 2 selects it as shown in FIG. 30. The utterance E1 is translated into Chinese in the utterance processing unit 102, and the utterance of

欢迎光临。 is notified to the utterance participant 1.

At this time, the utterance prediction unit 106 judges whether or not the utterance is inputted by a dialog participant (Step S405). When the utterance is inputted by the dialog participant (Step S405: YES), the utterance prediction unit 106 searches the prediction stack for a matching utterance starting with the opening utterance (Step S406), and judges whether or not there is a matching utterance (Step S407). In the case where there is a matching utterance (Step S407: YES), the utterance prediction unit 106 judges whether or not the matching utterance is the opening utterance of the prediction stack (Step S408). In the case where it is the opening utterance (Step S408: YES), it deletes the opening utterance of the prediction stack so as to update the prediction stack (Step S409). On the other hand, in the case where the utterance is not the opening utterance (Step S408: NO), it moves the block including the matching utterance to the opening part of the prediction stack, deletes the matching utterance and the utterances placed before the matching utterance so as to update the prediction stack (Step S410). After that, the utterance prediction unit 106 returns to the processing of judging whether or not the prediction stack is empty (Step S403).

Figure 31:
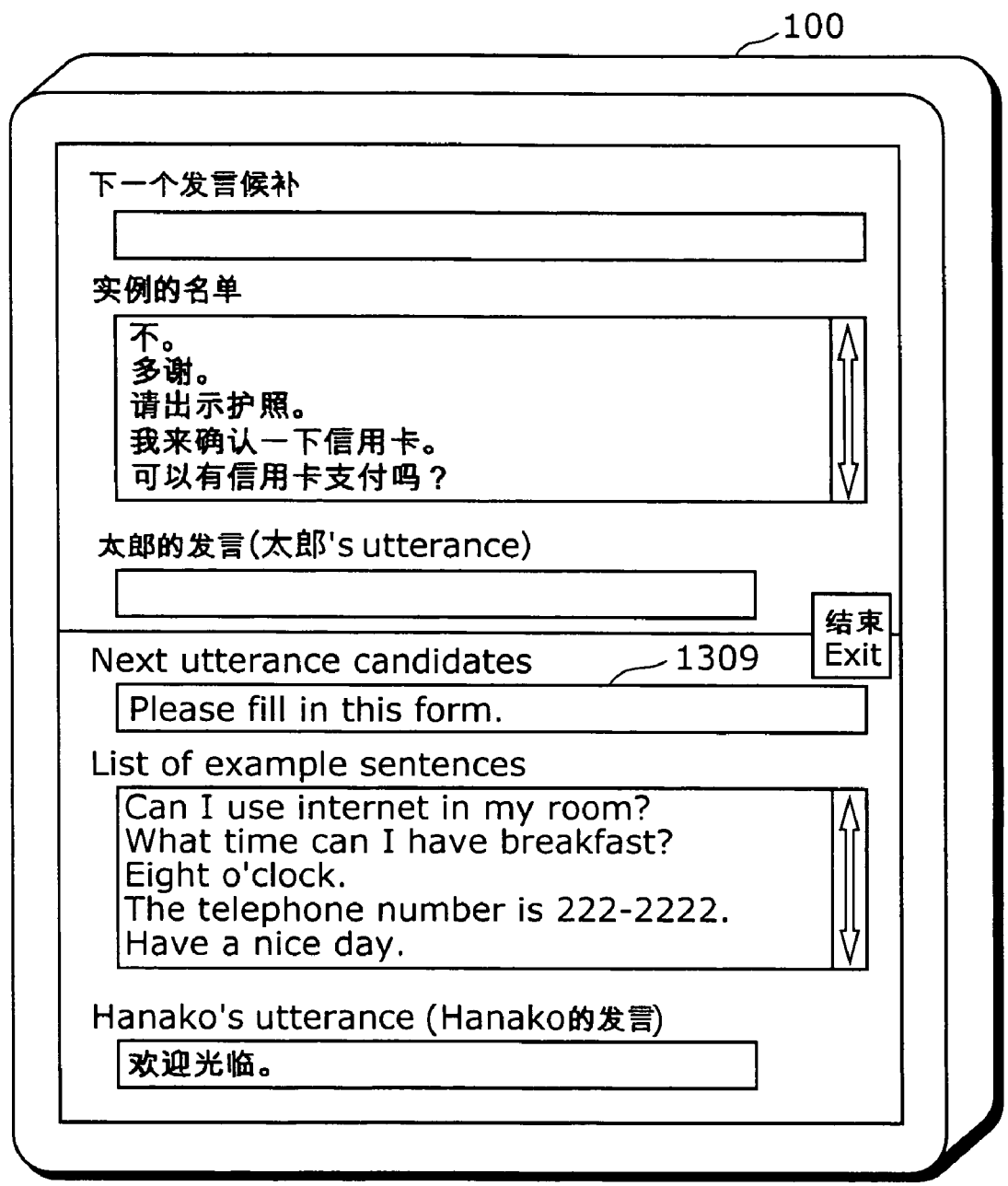
FIG. 31 is a diagram showing an example display of the dialog supporting apparatus of the present invention.

Since the utterance of a dialog participant is the utterance E1 in the above example, the prediction stack is updated to E8, C2, (E3, C4), and (E5, C6, E7). After that, it returns to the processing of judging whether or not the prediction stack is empty (Step S403). Since the prediction stack is still not empty, the opening utterance E8 of "Please fill in this form." is displayed on the prediction display area 1309 as shown in FIG. 31, and an utterance by one of the users is waited for.

Figure 32:
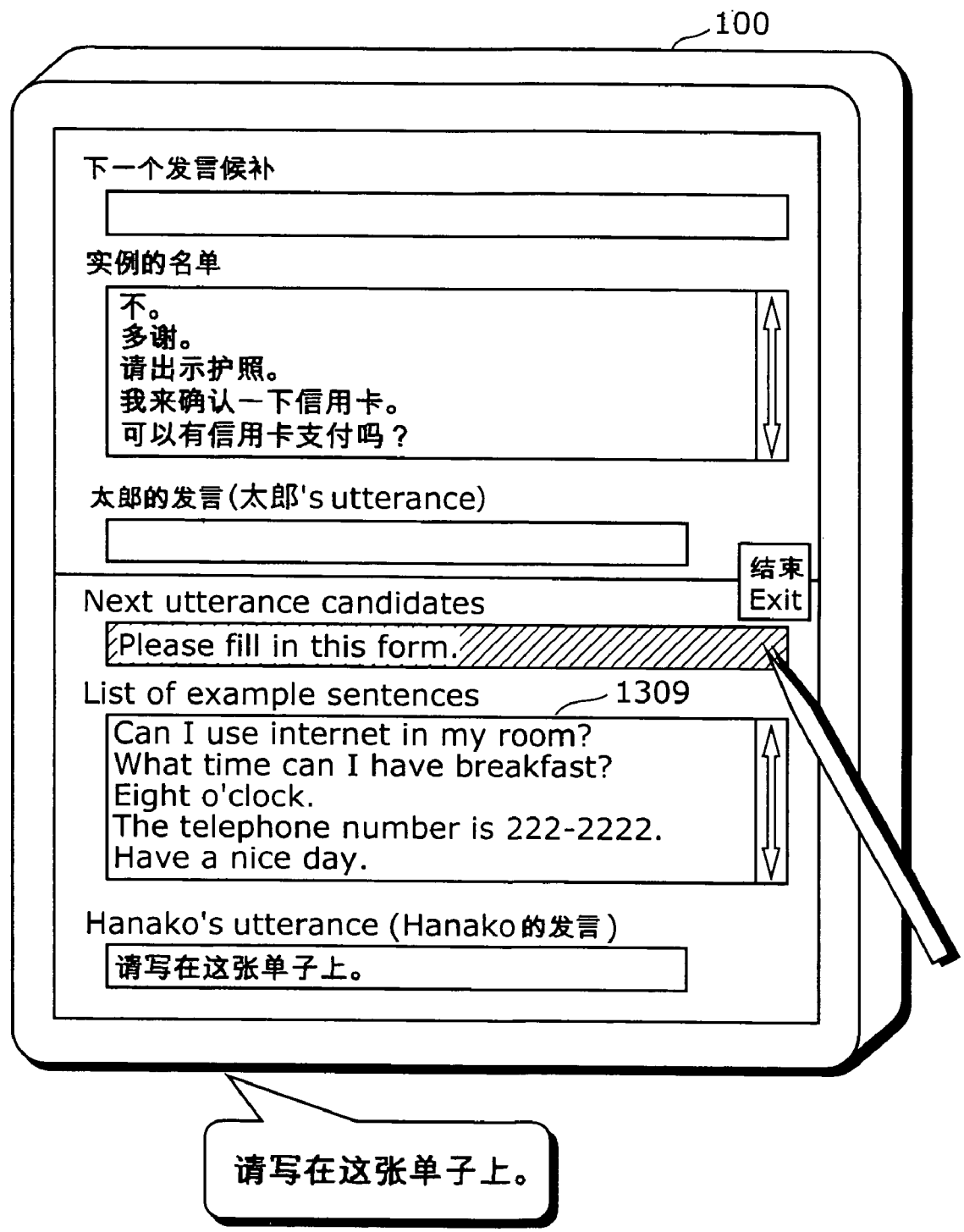
FIG. 32 is a diagram showing an example display of the dialog supporting apparatus of the present invention.

The dialog participant 2 may select an utterance from the example usage list 1305. However, the desired utterance has already been displayed on the prediction display area 1309. In the case where the dialog participant 2 selects the prediction display area 1309 as shown in FIG. 32, the utterance E8 is translated into Chinese by the utterance processing unit 102, and the utterance of

请写在这张单子上。 is notified to the dialog participant 1. Likewise, the utterance prediction unit 106 updates the prediction stack to C2, (E3, C4), and (E5, C6, E7), and displays the utterance of

Figure 33:
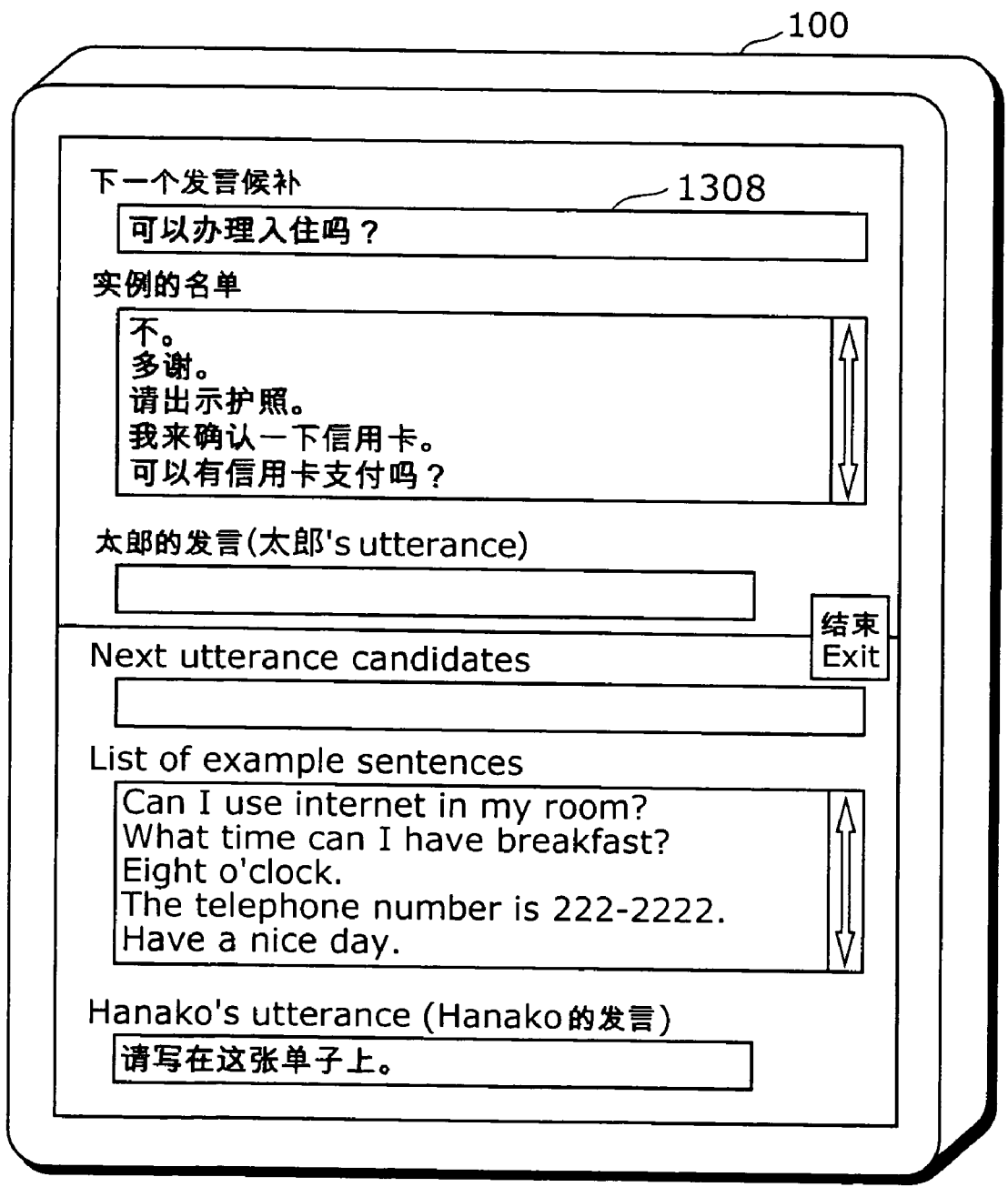
FIG. 33 is a diagram showing an example display of the dialog supporting apparatus of the present invention.

可以办理入住吗？ as shown in FIG. 33.

Figure 34:
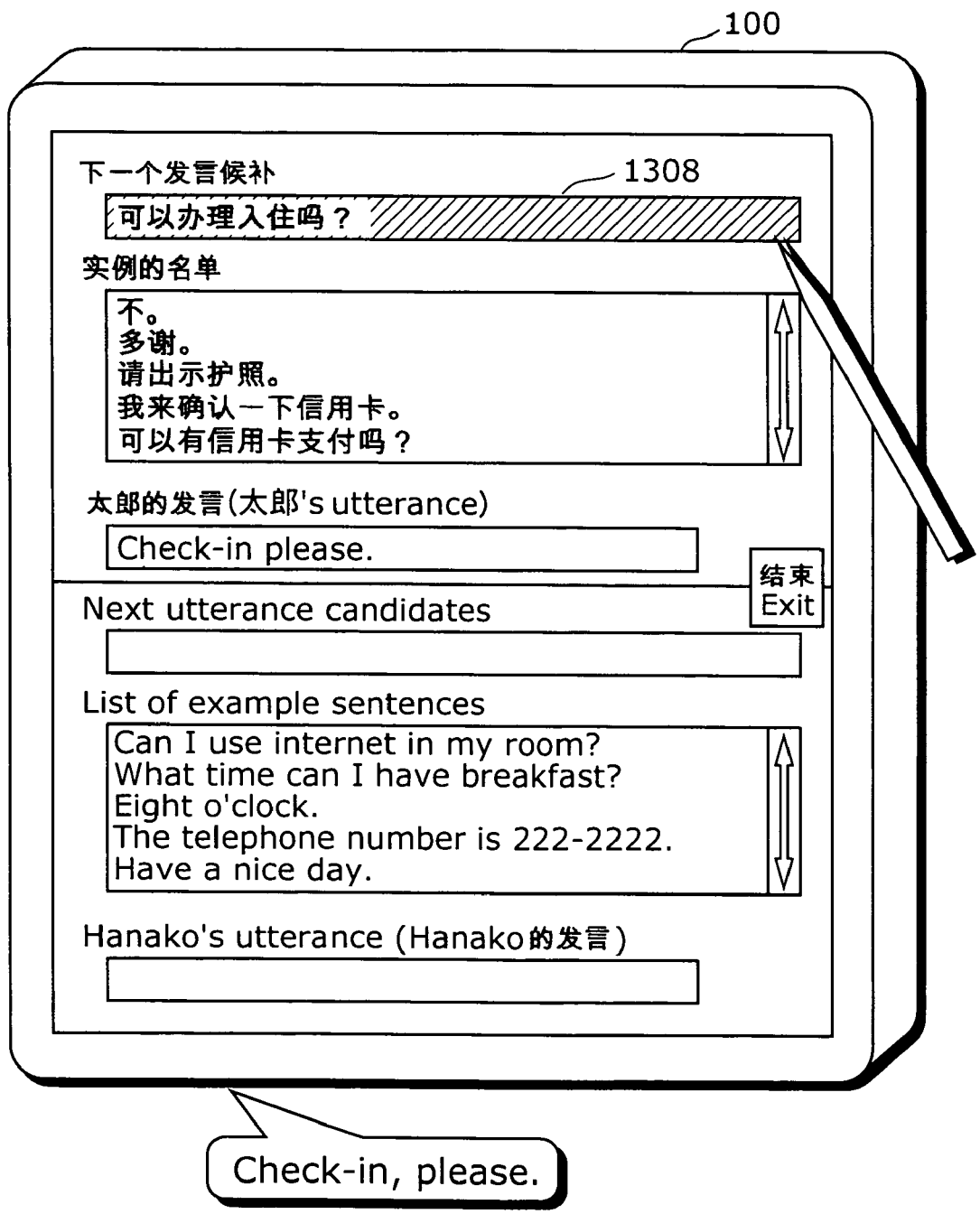
FIG. 34 is a diagram showing an example display of the dialog supporting apparatus of the present invention.
Figure 35:
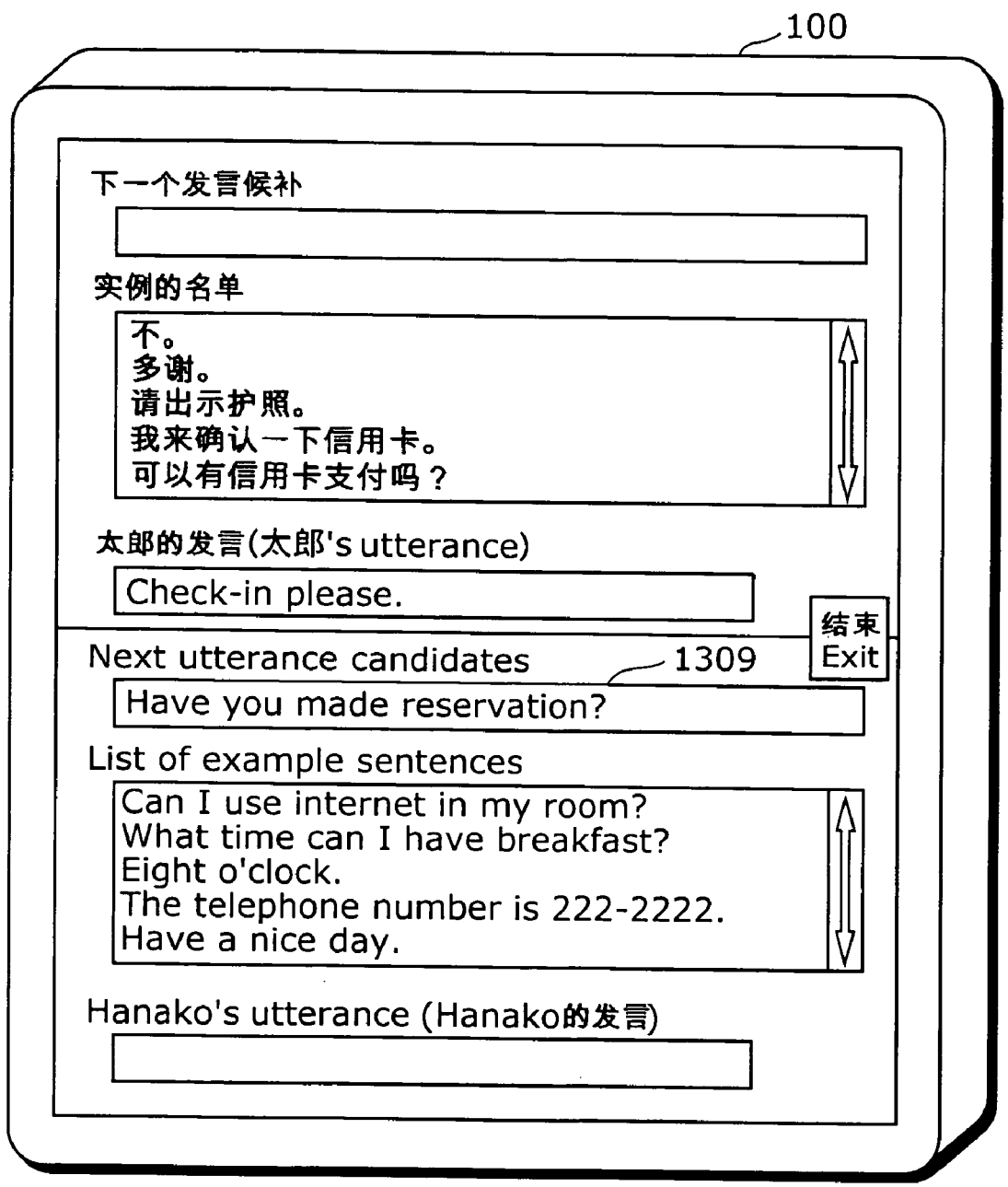
FIG. 35 is a diagram showing an example display of the dialog supporting apparatus of the present invention.

The dialog participant 1 may select an utterance from the example usage list 1304. However, the desired utterance has already been displayed on the prediction display area 1308. In the case where the dialog participant 1 selects the prediction display area 1308 as shown in FIG. 34, the utterance C2 is translated into English by the utterance processing unit 102, and the utterance of "Check-in, please." is notified to the dialog participant 2. Likewise, the utterance prediction unit 106 updates the prediction stack to (E3, C4), and (E5, C6, E7), and displays the utterance E3 of "Have you made reservation?" on the prediction display area 1309. In this way, the dialog participant 1 and the dialog participant 2 do not have to, respectively, search the example usage list 1304 and the example usage list 1305 for a desired utterance and smoothly communicate their intentions with each other. Therefore, it is possible to reduce the time to complete the dialog.

Figure 36:
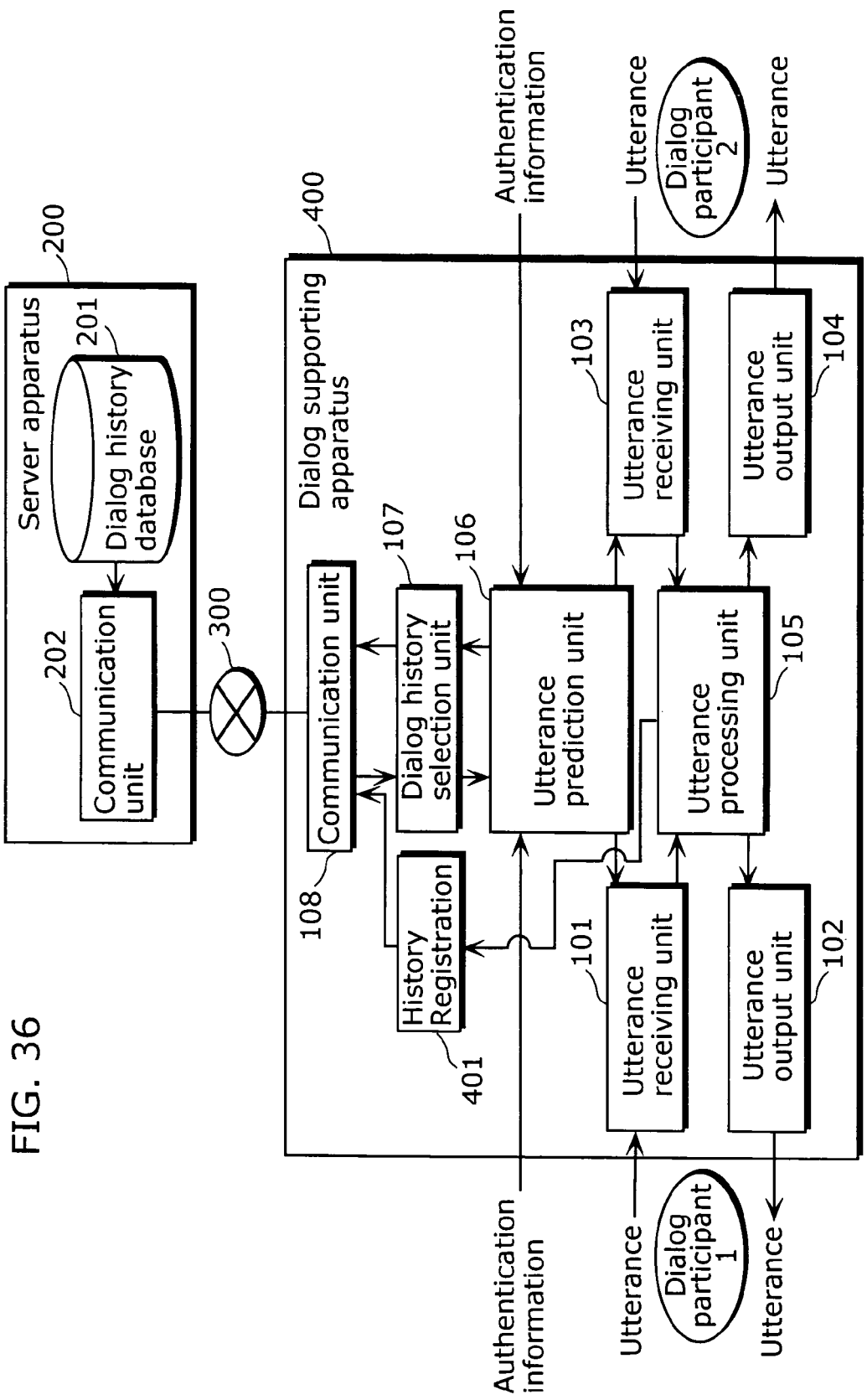
FIG. 36 is a block diagram showing the configuration of a second embodiment of a dialog supporting system of the present invention.
Figure 37:
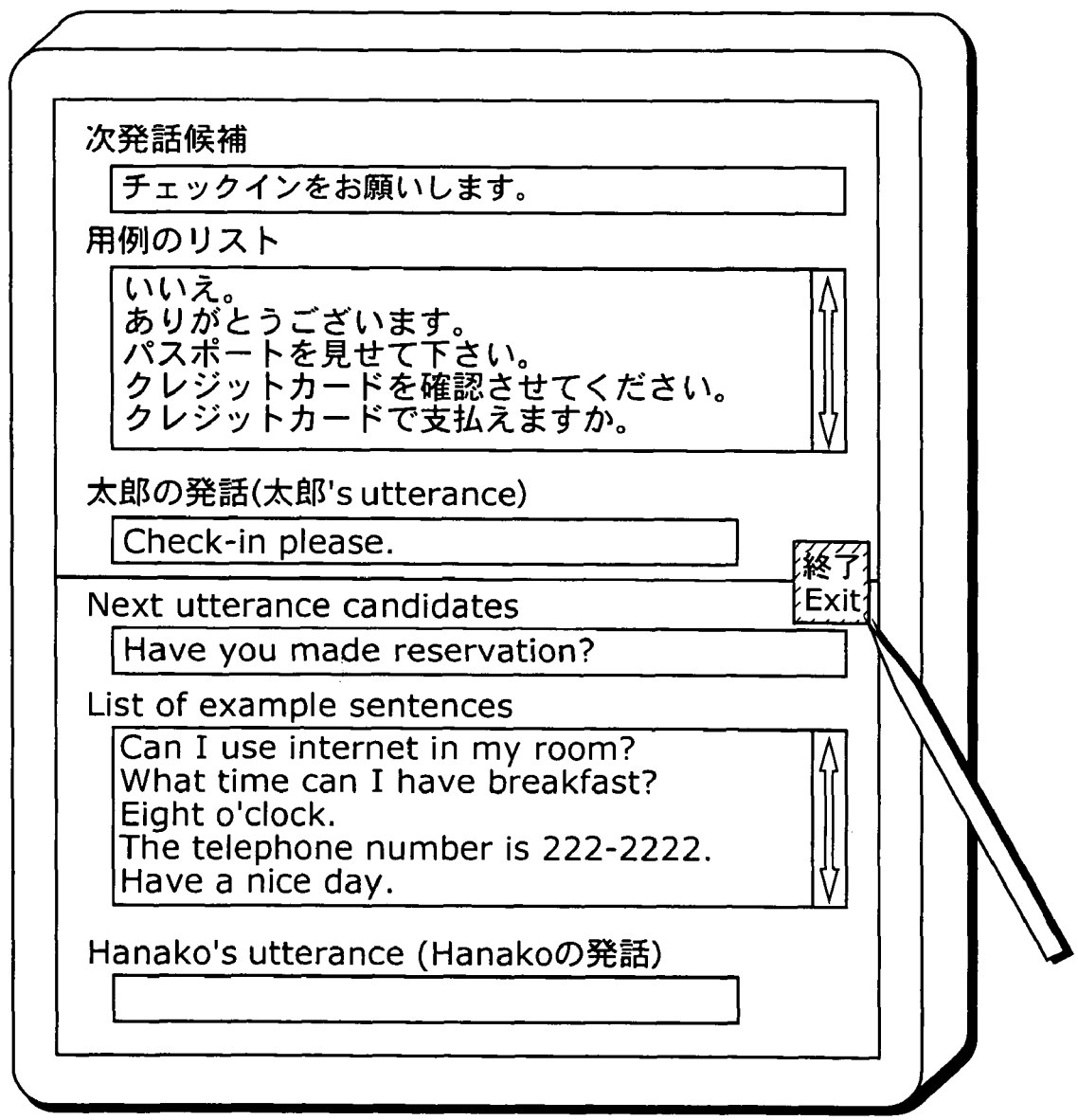
FIG. 37 is a diagram showing an example display of the dialog supporting apparatus of the present invention.
Figure 38:
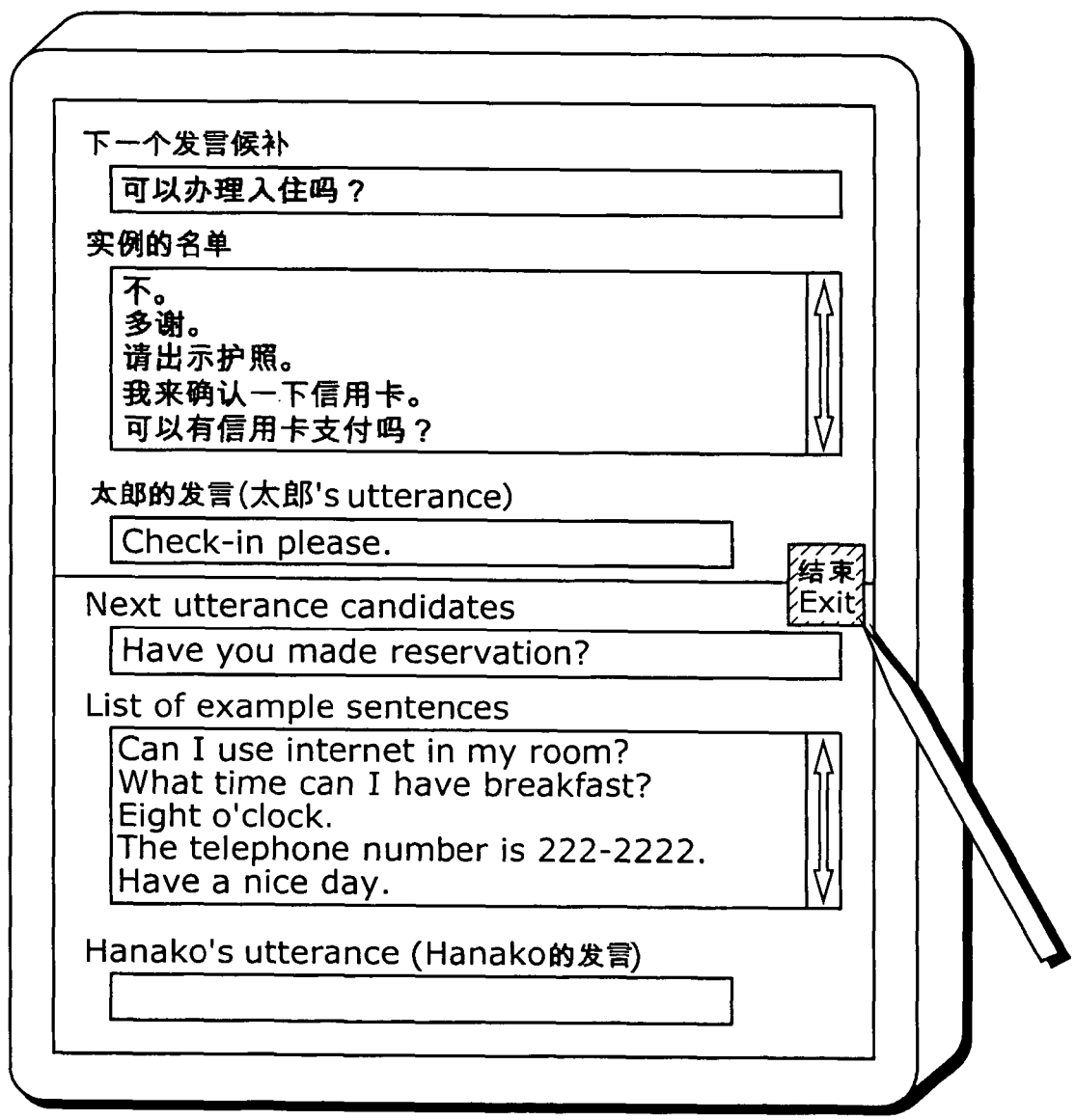
FIG. 38 is a diagram showing an example display of the dialog supporting apparatus of the present invention.

As shown in FIG. 36, it should be noted that a dialog supporting apparatus according to a second embodiment can be configured to have a history registration unit 401 in addition to the configuration shown in FIG. 1 so that the utterance processing unit 105 can record all the pieces of utterance information made between dialog to participants and that the history registration unit 401 can store the record in the dialog history database 201. In this way, it becomes possible to increase the number of dialog histories which are effective in the future utterance prediction. For example, as shown in FIGS. 37 and 38, this operation is executed at the time when a dialog participant instructs the end of the dialog. Especially, in the case where the dialog is made without according to the prediction of the utterance prediction unit 106, the dialog is not present in the dialog history database 201 in many cases. Therefore, to store the dialog makes it possible to perform the next utterance prediction with an improved accuracy.

Figure 39:
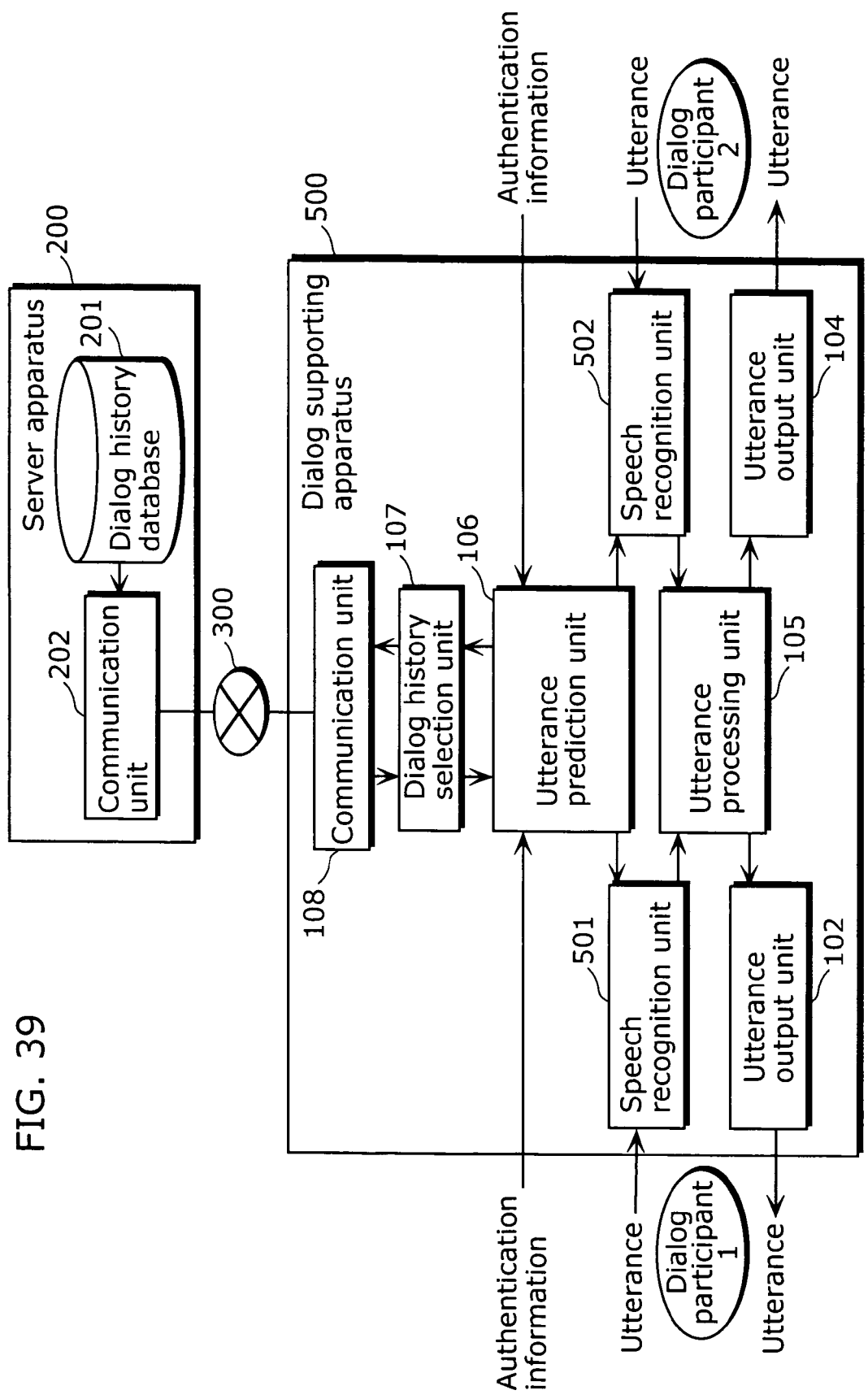
FIG. 39 is a block diagram showing the configuration of a third embodiment of a dialog supporting system of the present invention.
Figure 40A:
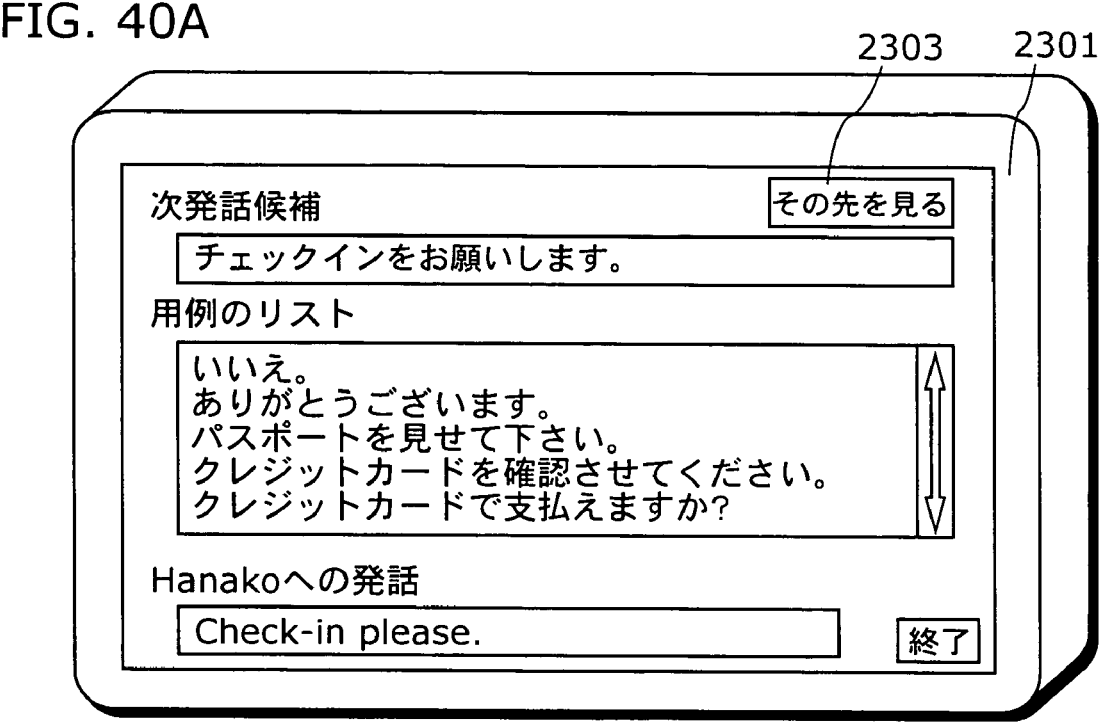
FIGS. 40A and 40B are diagrams showing an example of the displays of the dialog supporting apparatuses of the present invention in the case where the dialog participants are provided with the respective apparatuses.
Figure 40B:
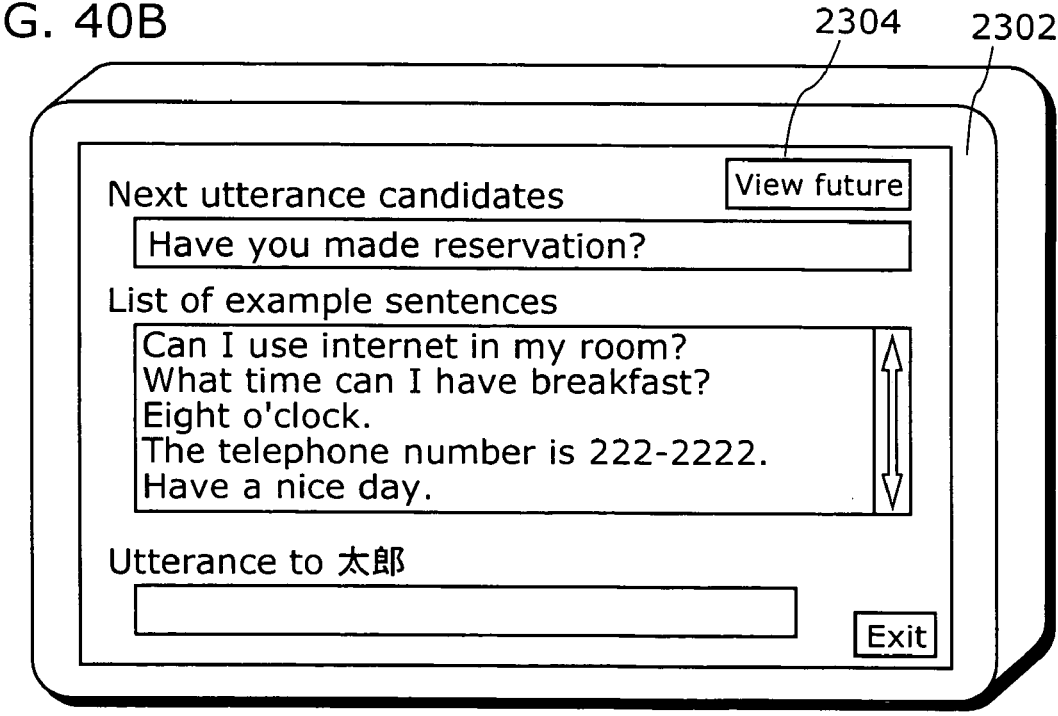
Figure 41A:
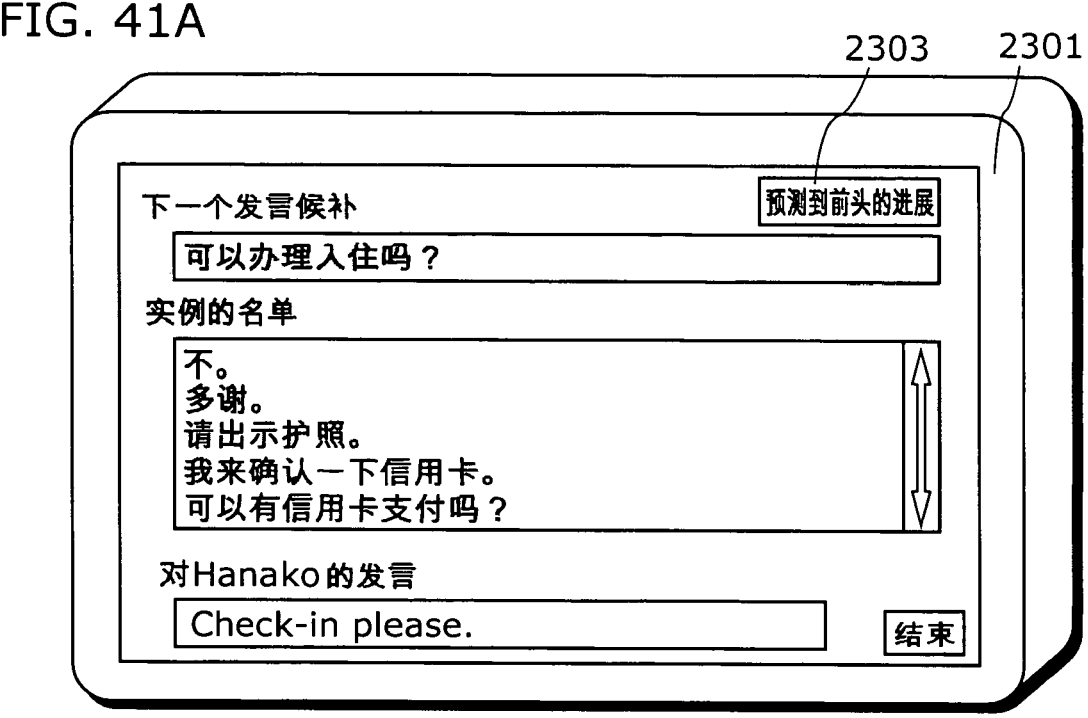
FIGS. 41A and 41B are diagrams showing an example of the displays of the dialog supporting apparatuses of the present invention in the case where the dialog participants are provided with the apparatuses.
Figure 41B:
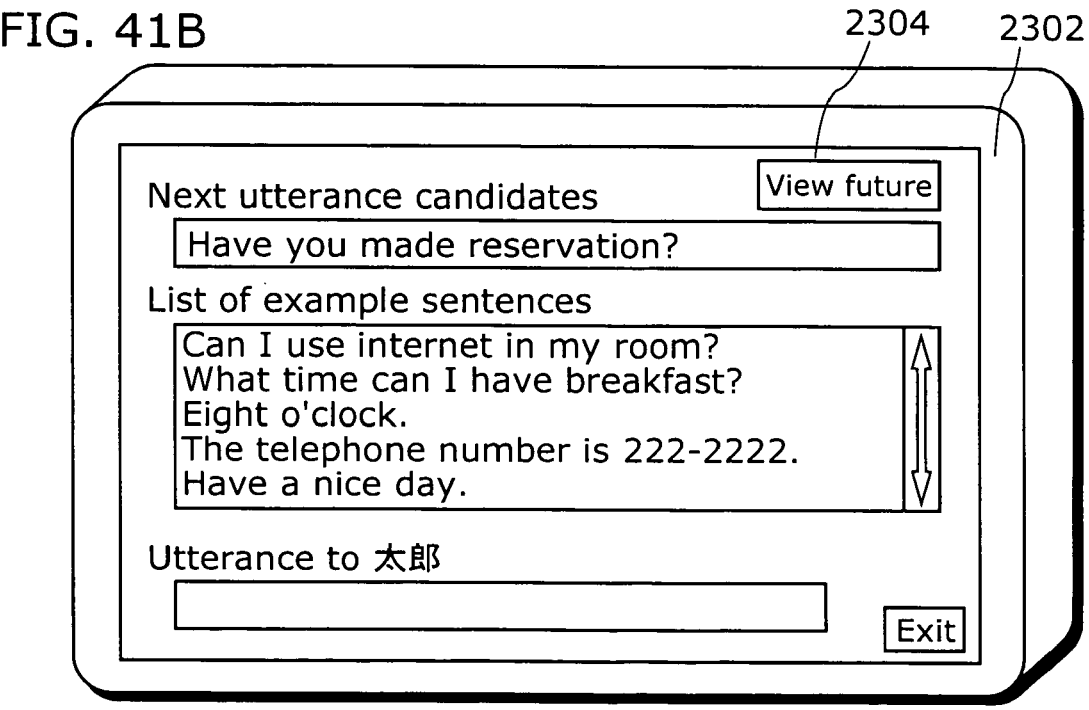

In addition, the dialog supporting apparatus of the second embodiment can be configured so that it includes a speech recognition unit 501 and a speech recognition unit 502 as shown in FIG. 39 in place of the utterance receiving unit 101 and the utterance receiving unit 103 in the configuration shown in FIG. 1. In this case, it becomes possible to improve the accuracy of speech recognition by preferentially selecting the vocabularies related to the utterances to be predicted by the utterance prediction unit 106 among the recognition target vocabularies of the speech recognition unit 501 and the speech recognition unit 502. Conceivably related vocabularies include: the prediction utterances themselves which are outputted by the utterance prediction unit 106; sentences related to the prediction utterances; words included in the prediction utterances; and words associated with the prediction utterances.

Figure 42A:
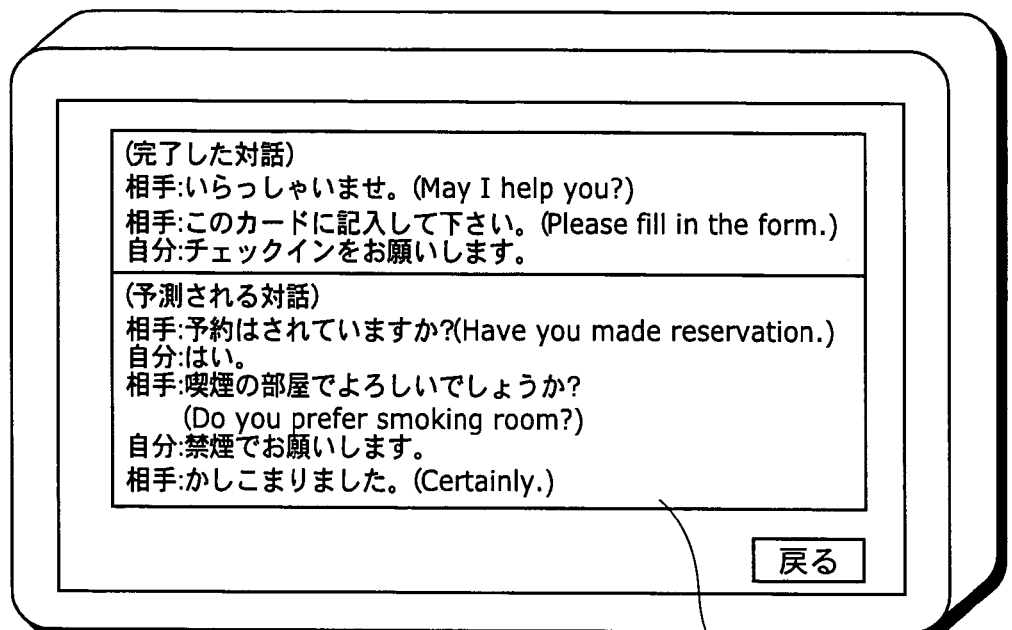
FIGS. 42A and 42B are diagrams showing an example of the displays of the dialog supporting apparatuses of the present invention in the case where the dialog participants are provided with the apparatuses.
Figure 42B:
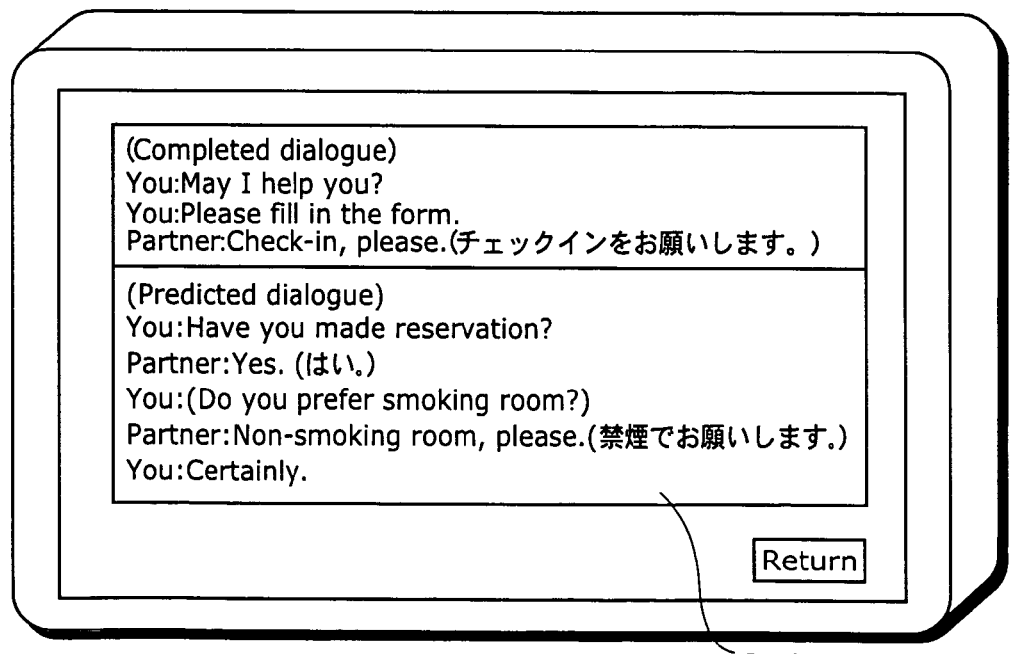

In addition, as shown in FIGS. 40A, 40B, 41A and 41B, it is also possible to further improve its usability by enabling each dialog participant to use a PDA implementing a dialog supporting apparatus. Here, dialog supporting apparatuses are implemented on a PDA 2301 used by the dialog participant 1 and a PDA 2301 used by the dialog participant 2, respectively. A button 2303 and a button 2304 are intended for enabling the respective dialog participants 1 and 2 to view the prediction development of the dialog. More specifically, when one of these buttons is pressed, the utterance prediction unit 106 displays the utterances made so far and all the contents of the current prediction stack. FIGS. 42A and 42B each is a diagram showing an example (Japanese and English) of prediction development of the dialog. It is assumed that the utterances made so far and the contents of the prediction stack are translated into the language of each dialog participant and displayed. Here, J1, J8, J2, (J3, J4), and (J5, J6, J7) are displayed on the prediction development display area 2401, and E1, E8, E2, (E3, E4) and (E5, E6, E7) are displayed on the prediction development display area 2402.

Figure 43A:
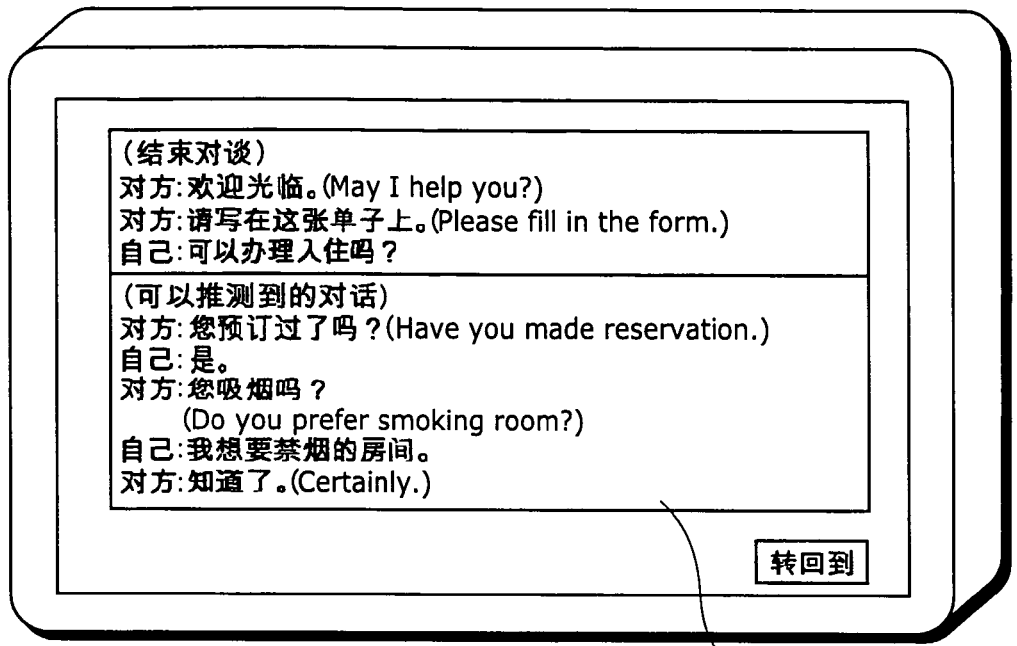
FIGS. 43A and 43B are diagrams showing an example of the displays of the dialog supporting apparatuses of the present invention in the case where the dialog participants are provided with the apparatuses.
Figure 43B:
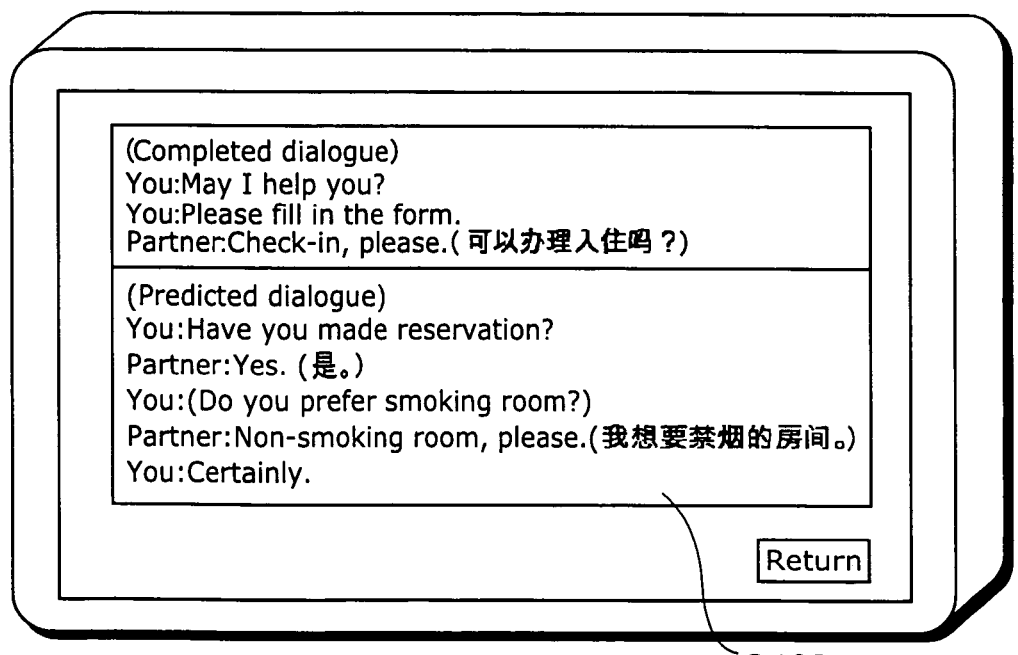

In addition, FIGS. 43A and 43B each is a diagram showing an example (Chinese and English) of prediction development of the dialog. It is assumed in FIGS. 43 A and 43B that the utterances made so far are E1, E8 and C2 and that the current prediction stack is (E3, C4), and (E5, C6, E7). The utterances made so far and the contents of the prediction stack are translated into the respective languages of the dialog participants and displayed. Here, C1, C8, C2, (C3, C4), and (C5, C6, C7) are displayed on the prediction development display area 2401, and E1, E8, E2, (E3, E4) and (E5, E6, E7) are displayed on the prediction development display area 2402.

To show dialog prediction development like this to the dialog participants enables the dialog participants to know an utterance of the other dialog participant. Since the dialog participants can organize their thoughts before making an utterance, they can handle the dialog supporting apparatus more accurately.

A case of Japanese and English and another case of Chinese and English are taken as examples described in the second embodiment. However, other languages such as French can also be the case described in the second embodiment, in other words, the present invention does not depend on languages.

Although only exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The dialog supporting apparatus of the present invention has a function for inputting utterances of dialog participants smoothly. It is useful as a translation application software or the like of mobile phones and mobile terminals. In addition, it is applicable in the use of public town terminals and guidance terminals and the like. Further, it is applicable in the use of, for example, a chat system where typical sentences are used.

What is claimed is:

1. A dialog supporting apparatus which supports an ongoing dialog made by a first dialog participant and a second dialog participant, said apparatus comprising:

a recording medium for storing a plurality of dialog histories each comprised of dialogs which are utterance strings of a plurality of people including the first dialog participant, the second dialog participant, and one or more dialog participants other than the first dialog participant and the second dialog participant, the dialog histories being stored in association with first information identifying the people, including the first dialog participant, the second dialog participant, and the one or more dialog participants other than the first dialog participant and the second dialog participant, of the dialog histories and second information indicating a topic of a dialog;

a dialog history selection unit operable to:

obtain the first information identifying the first dialog participant and the second dialog participant and the second information indicating the topic of the dialog;

extract, from said recording medium, one or more of the plurality of dialog histories based on the first information identifying the first dialog participant and the second dialog participant and the second information indicating the topic of the dialog, wherein each of the extracted one or more of the plurality of dialog histories is associated with a corresponding first dialog participant or second dialog participant indicated by the obtained first information and the topic of the dialog indicated by the obtained second information, and each of the extracted one or more of the plurality of dialog histories is either (i) a dialog history of a dialog made between the first dialog participant and a third dialog participant other than the second dialog participant or (ii) a dialog history of a dialog made between the second dialog participant and a fourth dialog participant other than the first dialog participant; and select, from said recording medium, a dialog history that is different from any of the extracted one or more of the plurality of dialog histories, wherein the selected dialog history has a highest degree of similarity with respect to the extracted one or more of the plurality of dialog histories; and an utterance prediction unit operable to predict a next utterance of either the first dialog participant or the second dialog participant in the dialog, based on the dialog history selected by said dialog history selection unit, and to predict, as a next utterance of either the first dialog participant or the second dialog participant in the dialog, an utterance which is included in the dialog history selected by said dialog history selection unit and appears next to an utterance corresponding to an utterance in the dialog.

2. The dialog supporting apparatus according to claim 1, wherein said dialog history selection unit is further operable to calculate a degree of similarity between each of the dialog histories other than the extracted one or more of the plurality of dialog histories, by using as an utterance block, an assembly which corresponds to successive utterances and is commonly included in each of the dialog histories and the extracted one or more of the plurality of dialog histories, to determine degrees of similarity which are inversely proportional to a number of the utterance blocks or to determine degrees of similarity which are proportional to a mean of numbers of utterances included in utterance blocks, wherein the dialog history having the highest degree of similarity is selected, from the determined degrees of similarity, and from among the dialog histories of each of the dialog participants.

3. The dialog supporting apparatus according to claim 2, wherein said dialog history selection unit is further operable to identify numbers of utterances included in respective assemblies, and calculate, by using the identified numbers of utterances, the degree of similarity which is proportional to a mean of the numbers of utterances included in the respective assemblies.

4. The dialog supporting apparatus according to claim 2, wherein said dialog history selection unit is further operable to adjust the numbers of utterances in each of two selected dialog histories to a same number using a dynamic programming, based on the dialog histories and the degree of similarity calculated.

5. The dialog supporting apparatus according to claim 2, wherein said dialog history selection unit is further operable to judge whether or not an utterance is commonly included in each of two selected dialog histories by performing at least one of the following matchings: a matching based on utterance information for identifying the utterance; a matching based on a surface expression; and a matching based on a content word.

6. The dialog supporting apparatus according to claim 1, wherein said utterance prediction unit is further operable to predict that the next utterance of one of the dialog participants in the dialog is an utterance in the dialog history which is stored next to an utterance in the dialog history corresponding to an utterance in the dialog, and wherein the dialog history is selected by said dialog history selection unit.

7. The dialog supporting apparatus according to claim 1, further comprising:
an utterance receiving unit operable to receive an utterance of one of the dialog participants;
an utterance processing unit operable to transform the utterance received by said utterance receiving unit into another utterance form; and
an utterance outputting unit operable to output the utterance of the other utterance form transformed by said utterance processing unit.

8. The dialog supporting apparatus according to claim 7, wherein said utterance receiving unit is further operable to:
perform speech recognition of a speech to be inputted from one of the following vocabularies:
prediction utterances predicted by said utterance prediction unit;
sentences which are substantially the same as the prediction utterances;
words included in the prediction utterances; and
words associated with the prediction utterances; and
receive a result of the speech recognition which is the utterance.

9. The dialog supporting apparatus according to claim 7, said apparatus further comprising a display unit, wherein:
said utterance prediction unit is further operable to display the prediction utterance on said display unit; and
said utterance receiving unit is further operable to receive the prediction utterance which is the utterance, when the prediction utterance is selected by one of the dialog participants.

10. The dialog supporting apparatus according to claim 7, said apparatus further comprising a display unit, wherein said utterance prediction unit is further operable to predict a development of utterances made by the dialog participants in the dialog, based on the dialog history selected by said dialog history selection unit, and is further operable to display the predicted development of the utterances on said display unit.

11. The dialog supporting apparatus according to claim 1, said apparatus further comprising a history registration unit operable to register a history of the dialog made by the dialog participants in said recording medium.

12. A dialog supporting system comprising:
a dialog supporting apparatus and a server apparatus which support an on-going dialog made by a first dialog participant and a second dialog participant,
wherein said server apparatus comprises:
a recording medium for storing a plurality of dialog histories each comprised of dialogs which are utterance strings of a plurality of people including the first dialog participant, the second dialog participant, and one or more dialog participants other than the first dialog participant and the second dialog participant, the dialog histories being stored in association with first information identifying the people, including the first dialog participant, the second dialog participant, and the one or more dialog participants other than the first dialog participant and the second dialog participant, of the dialog histories and second information indicating a topic of a dialog; and
a dialog history selection unit operable to:
obtain the first information identifying the first dialog participant and the second dialog participant and the second information indicating the topic of the dialog;
extract, from said recording medium, one or more of the plurality of dialog histories based on the first information identifying the first dialog participant and the second dialog participant and the second information indicating the topic of the dialog, wherein each of the extracted one or more of the plurality of dialog histories is associated with a corresponding first dialog participant or second dialog participant indicated by the obtained first information and the topic of the dialog indicated by the obtained second information, and each of the extracted one or more of the plurality of dialog histories is either (i) a dialog history of a dialog made between the first dialog participant and a third dialog participant other than the second dialog participant or (ii) a dialog history of a dialog made between the second dialog participant and a fourth dialog participant other than the first dialog participant; and
select, from said recording medium, a dialog history that is different from the extracted one or more of the plurality of dialog histories, wherein the selected dialog history has a highest degree of similarity with respect to the extracted one or more of the plurality of dialog histories, and wherein said dialog supporting apparatus comprises an utterance prediction unit operable to:
request one of the dialog histories from said server apparatus by sending, to said server apparatus, the first information identifying the first dialog participant and the second dialog participant; and
predict a next utterance of either the first dialog participant or the second dialog participant in the dialog, based on the dialog history sent by said server apparatus, and predict, as a next utterance of either the first dialog participant or the second dialog participant in the dialog, an utterance which is included in the dialog history selected by said dialog history selection unit and appears next to an utterance corresponding to an utterance in the dialog.

13. A dialog supporting method for supporting an on-going dialog made by a first dialog participant and a second dialog participant, said method comprising:
storing, in a recording medium, a plurality of dialog histories each comprised of dialogs which are utterance strings of a plurality of people including the first dialog participant, the second dialog participant, and one or more dialog participants other than the first dialog participant and the second dialog participant, wherein the dialog histories are stored in association with first information identifying the people, including the first dialog participant, the second dialog participant, and the one or more dialog participants other than the first dialog participant and the second dialog participant, of the dialog histories and second information identifying a topic of a dialog;
obtaining the first information identifying the first dialog participant and the second dialog participant and the second information indicating the topic of the dialog;
extracting, from said recording medium, one or more of the plurality of dialog histories based on the first information identifying the first dialog participant and the second dialog participant and the second information indicating the topic of the dialog, wherein each of the extracted one or more of the plurality of dialog histories is associated with a corresponding first dialog participant or second dialog participant indicated by the obtained first information and the topic of the dialog indicated by the obtained second information, and each of the extracted one or more of the plurality of dialog histories is either (i) a dialog history of a dialog made between the first dialog participant and a third dialog participant other than the second dialog participant or (ii) a dialog history of a dialog made between the second dialog participant and a fourth dialog participant other than the first dialog participant;
selecting, from said recording medium, a dialog history that is different from any of the extracted one or more of the plurality of dialog histories, wherein the selected dialog history has a highest degree of similarity with respect to the extracted one or more of the plurality of dialog histories; and
predicting a next utterance of either the first dialog participant or the second dialog participant in the dialog, based on the dialog history selected in said selecting of the dialog history, and predicting, as a next utterance of either the first dialog participant or the second dialog participant in the dialog, an utterance which is included in the dialog history selected in said selecting the dialog history and appears next to an utterance corresponding to an utterance in the dialog.

14. A non-transitory computer-readable recording medium having stored therein a program for supporting an on-going dialog made by a first dialog participant and a second dialog participant, said program causing a computer to execute at least the following:
storing, in a dialog history database, a plurality of dialog histories each comprised of dialogs which are utterance strings of a plurality of people including the first dialog participant, the second dialog participant, and one or more dialog participants other than the first dialog participant and the second dialog participant, wherein the dialog histories are stored in association with first information identifying the people, including the first dialog participant, the second dialog participant, and the one or more dialog participants other than the first dialog participant and the second dialog participant, of the dialog histories and second information identifying a topic of a dialog;
obtaining the first information identifying the first dialog participant and the second dialog participant and the second information indicating the topic of the dialog;
extracting, from said dialog history database, one or more of the plurality of dialog histories based on the first information identifying the first dialog participant and the second dialog participant and the second information indicating the topic of the dialog, wherein each of the extracted one or more of the plurality of dialog histories is associated with a corresponding first dialog participant or second dialog participant indicated by the first information and the topic of the dialog indicated by the obtained second information, and each of the extracted one or more of the plurality of dialog histories is either (i) a dialog history of a dialog made between the first dialog participant and a third dialog participant other than the second dialog participant or (ii) a dialog history of a dialog made between the second dialog participant and a fourth dialog participant other than the first dialog participant;
selecting, from said dialog history database, a dialog history that is different from any of the extracted one or more of the plurality of dialog histories, wherein the selected dialog history has a highest degree of similarity with respect to the extracted one or more of the plurality of dialog histories; and
predicting a next utterance of either the first dialog participant or the second dialog participant in the dialog, based on the dialog history selected in said selecting of the dialog history, and predicting, as a next utterance of either the first dialog participant or the second dialog participant in the dialog, an utterance which is included in the dialog history selected in said selecting the dialog history and appears next to an utterance corresponding to an utterance in the dialog.

* * * * *